US 11,681,679 B2

(12) United States Patent
Dalgliesh

(10) Patent No.: US 11,681,679 B2
(45) Date of Patent: Jun. 20, 2023

(54) SYSTEMS AND METHODS FOR PERFORMING TREE-STRUCTURED DATASET OPERATIONS

(71) Applicants: Atlassian Pty Ltd., Sydney (AU); Atlassian Inc., San Francisco, CA (US)

(72) Inventor: Eric Dalgliesh, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 16/696,115

(22) Filed: Nov. 26, 2019

(65) Prior Publication Data
US 2021/0117397 A1     Apr. 22, 2021

(30) Foreign Application Priority Data

Sep. 25, 2019 (AU) ................................ 2019903578

(51) Int. Cl.
| | |
|---|---|
| G06F 16/22 | (2019.01) |
| G06F 16/2455 | (2019.01) |
| G06F 16/23 | (2019.01) |
| G06F 16/25 | (2019.01) |

(52) U.S. Cl.
CPC ...... *G06F 16/2272* (2019.01); *G06F 16/2246* (2019.01); *G06F 16/23* (2019.01); *G06F 16/24558* (2019.01); *G06F 16/25* (2019.01)

(58) Field of Classification Search
None
See application file for complete search history.

(56) References Cited

U.S. PATENT DOCUMENTS

| | | | | |
|---|---|---|---|---|
| 6,741,983 | B1* | 5/2004 | Birdwell | G06F 16/285 |
| | | | | 707/999.005 |
| 7,356,549 | B1* | 4/2008 | Bruso | G06F 16/2246 |
| | | | | 707/972 |
| 7,702,640 | B1 | 4/2010 | Vermeulen et al. | |
| 7,865,608 | B1 | 1/2011 | Schuba et al. | |
| 9,553,771 | B1 | 1/2017 | McKenna et al. | |
| 10,235,397 | B1* | 3/2019 | Shilane | G06F 16/2246 |

(Continued)

OTHER PUBLICATIONS

Crainiceanu, Adina, "Bloofi: a Hierarchical Bloom Filter Index with Applications to Distributed Data Provenance," Cloud-I '13: Proceddings of the 2nd International Workshop on Cloud Intelligence, https://doi.org/10.1145/2501928.2501931, pp. 1-8, 2013.

*Primary Examiner* — Alford W Kindred
*Assistant Examiner* — Cao D Vuong
(74) *Attorney, Agent, or Firm* — Brownstein Hyatt Farber Schreck, LLP

(57) ABSTRACT

Described herein is a computer implemented method for inserting a new item to a tree-structured dataset. The method comprises: calculating a new item data summary; generating a new leaf node for storing the new item and the new item data summary; adding the new leaf node to the dataset; and recalculating data summaries for all internal dataset nodes in an update path starting at a parent of the new leaf node and ending at a root node of the dataset. The data summary for a given internal node in the update path is calculated based on data summaries for each of the given internal node's children nodes.

20 Claims, 9 Drawing Sheets

(56) References Cited

U.S. PATENT DOCUMENTS

| | | |
|---|---|---|
| 2009/0112905 A1* | 4/2009 | Mukerjee .............. G06F 16/322 |
| | | 707/999.102 |
| 2011/0066637 A1 | 3/2011 | Wang et al. |
| 2011/0128960 A1 | 6/2011 | Bando et al. |
| 2011/0153979 A1* | 6/2011 | Boyle ................. G06F 12/1009 |
| | | 711/E12.078 |
| 2014/0108435 A1 | 4/2014 | Kolesnikov et al. |
| 2014/0143549 A1 | 5/2014 | Araki et al. |
| 2014/0195542 A1 | 7/2014 | Larson et al. |
| 2015/0088844 A1* | 3/2015 | Stigsen ................. G06F 16/221 |
| | | 707/703 |
| 2015/0278271 A1 | 10/2015 | Chander et al. |
| 2016/0371296 A1 | 12/2016 | Passey et al. |
| 2017/0255624 A1 | 9/2017 | Sharma et al. |
| 2018/0011887 A1* | 1/2018 | Rozenwald ......... G06F 16/9024 |
| 2018/0089243 A1 | 3/2018 | Warren, Jr. et al. |
| 2018/0089245 A1* | 3/2018 | Warren, Jr. ......... G06F 16/2246 |
| 2018/0225315 A1 | 8/2018 | Boles et al. |
| 2020/0004852 A1* | 1/2020 | Qiu ....................... G06F 16/128 |
| 2020/0082006 A1 | 3/2020 | Rupp et al. |
| 2020/0293506 A1* | 9/2020 | Gupta ............... G06F 16/24568 |
| 2020/0341959 A1* | 10/2020 | Shabi ................. G06F 16/2246 |

* cited by examiner

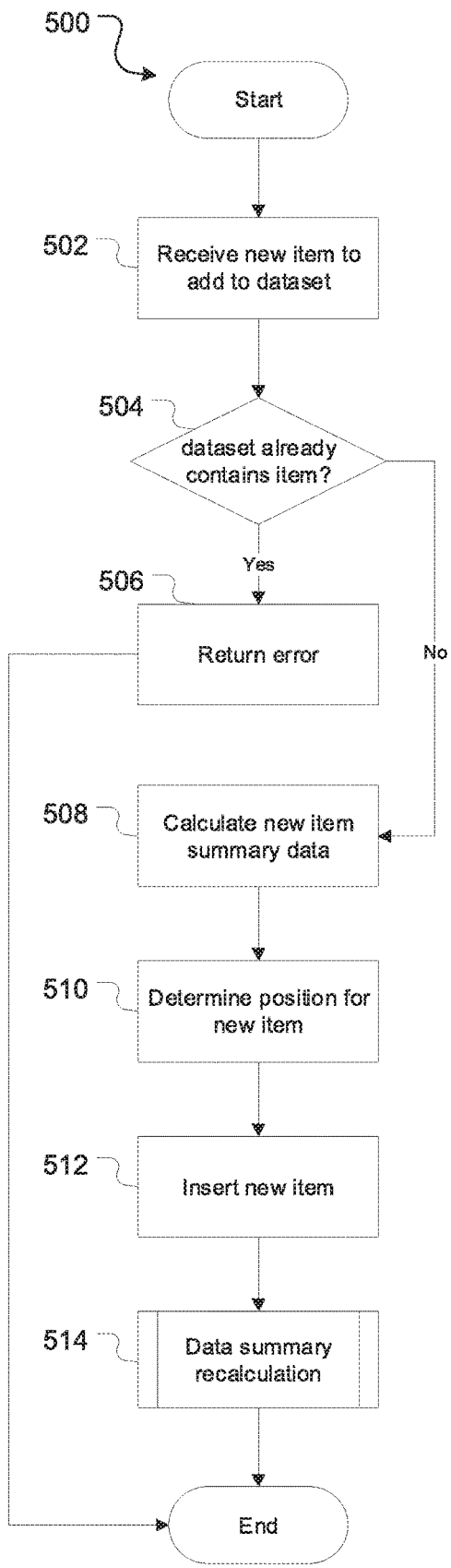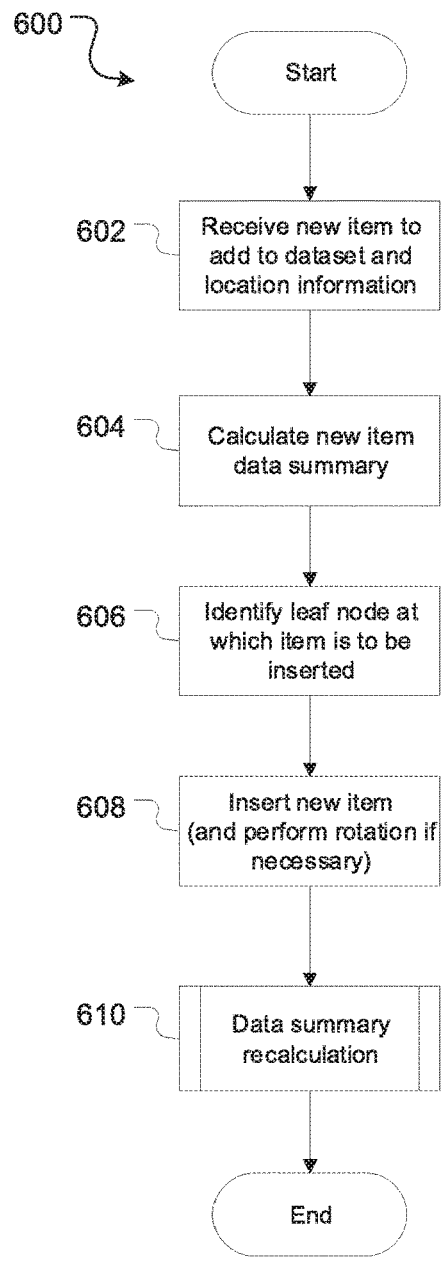
Figure 5
Figure 6

SYSTEMS AND METHODS FOR PERFORMING TREE-STRUCTURED DATASET OPERATIONS

CROSS-REFERENCE TO RELATED APPLICATION(S)

This application claims the benefit of Australian patent application no. 2019903578, filed Sep. 25, 2019 and titled "System and Methods for Performing Tree-Structured Dataset Operations," the disclosure of which is hereby incorporated herein by reference in its entirety.

FIELD

The present disclosure is directed to systems and methods for performing tree-structured data set operations.

BACKGROUND

Many computer applications involve storing, searching for, and/or retrieving data.

As one example, consider a work processing job involving a number of tasks to be run on/performed by a limited resource (e.g. emails to send, reports to generate, or any other tasks to be performed). One way of doing this is to add tasks to be performed to a queue. A queue can be backed by a set (in which case the same task cannot be added more than once) or a list (in which case the queue can be ordered by the next item to be processed). To perform the tasks in the queue, a consumer process or application selects the item at the front of the queue, removes it from the queue, and processes it.

In many scenarios, the task to be performed for each queue item will be expensive (e.g. from a processing or other computational resource perspective), so it is advantageous to be able to cancel tasks by removing them from the queue (or the list or set being used to implement the queue). Similarly, in some cases the same task may need to be performed multiple times, which can be achieved by adding the task (item) to the queue multiple times (where the queue is supported by a list).

In such a scenario, therefore, it is advantageous to be able to find and remove items from the queue quickly and efficiently—or, at the least, there are advantages to such operations not getting significantly slower as the queue grows in size.

To try to facilitate such operations, various means for storing data have been created.

For example, one way in which data can be stored is via linked lists. Generally speaking, a linked list is made up of a plurality of data objects, each data object including both the payload (i.e. the actual data being stored) and a pointer to the next item in the list. Searching for particular data within a linked list can however be computationally expensive. For a singly linked list, the average time complexity for searching is linear—O(n): i.e. if the number of data objects in the linked-list doubles the time taken to search for an item will, in the worst case, also double.

In many cases, dataset operations (e.g. searching for items, adding items, deleting items) are performed relatively frequently. Given this, any improvement in such operations—for example reducing the time taken and/or the computational processing resources required—is desirable.

Background information described in this specification is background information known to the inventors. Reference to this information as background information is not an acknowledgment or suggestion that this background information is prior art or is common general knowledge to a person of ordinary skill in the art.

SUMMARY

Described herein is a computer implemented method for inserting a new item to a tree-structured dataset, the method comprising: calculating a new item data summary for the new item using a data summary calculation algorithm; generating a new leaf node for storing the new item and the new item data summary; determining a location for the new leaf node in the dataset; adding the new leaf node to the dataset based on the determined location; and recalculating data summaries for all internal dataset nodes in an update path starting at a parent of the new leaf node and ending at a root node of the dataset, wherein the data summary for a given internal node in the update path is calculated based on data summaries for each of the given internal node's children nodes.

In some implementations, each data summary is a bitset and the data summary calculation algorithm may include a bloom filter. Calculating the data summary data for a given internal node may include performing a logical or operation on all data summaries of the given internal node's children nodes.

In some cases, determining a location for the new item in the dataset comprises commencing at the root node and recursively selecting a particular child node based on a smallest number of total descendants of that particular child node. A location for the new item may be determined based on a received insertion location and node data recording, for each node, a total number of leaf descendants of that node.

Prior to adding the new leaf node to the dataset the method may also include: determining if the dataset already contains the new item; and in response to determining that the dataset already contains the new item, foregoing adding the new leaf node to the dataset. Determining if the data set already contains the new item may include: determining whether a root node data summary matches the new item data summary; and in response to determining that the root node data summary does not match the particular item data summary, determining that the dataset does not already contain the new item.

The determined location may be an existing leaf node and inserting the new leaf node to the dataset may include: creating a new internal node and inserting it at the position of the existing leaf node; inserting the existing leaf node as one child of the new internal node; and inserting the new leaf node as another child of the new internal node. The existing leaf node may be inserted as a left child of the new internal node and the new leaf node is inserted as a right child of the new internal node.

Some example embodiments are directed to a computer processing system comprising: a processing unit; a communication interface; and a non-transient computer-readable storage medium storing instructions, which when executed by the processor, cause the processing unit to perform various operations. The operations may include: calculating a new item data summary for the new item using a data summary calculation algorithm; generating a new leaf node for storing the new item and the new item data summary; determining a location for the new leaf node in the dataset; adding the new leaf node to the dataset based on the determined location; and recalculating data summaries for all internal dataset nodes in an update path starting at a parent of the new leaf node and ending at a root node of the dataset. The data summary for a given internal node in the update path may be calculated based on data summaries for each of the given internal node's children nodes.

In some implementations, each data summary is a bitset and the data summary calculation algorithm may include a bloom filter. Calculating the data summary data for a given internal node may include performing a logical or operation on all data summaries of the given internal node's children nodes. Determining a location for the new item in the dataset may include commencing at the root node and recursively selecting a particular child node based on a smallest number of total descendants of that particular child node. A location for the new item may be determined based on a received insertion location and node data recording, for each node, a total number of leaf descendants of that node.

In some cases, prior to adding the new leaf node to the instructions may cause the processing unit to: determine if the dataset already contains the new item; and in response to determining that the dataset already contains the new item, forego adding the new leaf node to the dataset. In some cases, determining if the data set already contains the new item comprises: determining whether a root node data summary matches the new item data summary; and in response to determining that the root node data summary does not match the particular item data summary, determining that the dataset does not already contain the new item.

The determined location may be an existing leaf node and inserting the new leaf node to the dataset may include: creating a new internal node and inserting it at the position of the existing leaf node; inserting the existing leaf node as one child of the new internal node; and inserting the new leaf node as another child of the new internal node.

Some example embodiments are directed to a non-transient computer-readable storage medium storing instructions, which when executed by a processing unit, cause the processing unit to: calculate a new item data summary for the new item using a data summary calculation algorithm; generate a new leaf node for storing the new item and the new item data summary; determine a location for the new leaf node in the dataset; add the new leaf node to the dataset based on the determined location; and recalculate data summaries for all internal dataset nodes in an update path starting at a parent of the new leaf node and ending at a root node of the dataset, wherein the data summary for a given internal node in the update path is calculated based on data summaries for each of the given internal node's children nodes.

BRIEF DESCRIPTION OF THE DRAWINGS

In the drawings:

FIG. 5 is a flowchart depicting operations performed in an add item process;

FIG. 6 is a flowchart depicting operations performed in an insert item process;

Figure 1:
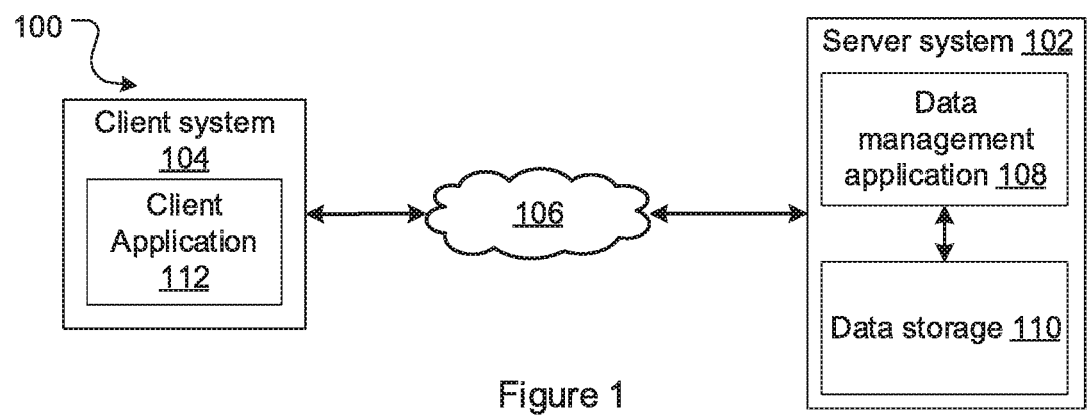
FIG. 1 is a diagram depicting a computing environment in which various features of the present disclosure may be implemented.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

This description takes the following outline:
1. Overview
2. Example computing environment
3. Set-type and list-type data structures
4. Summary data generation and comparison
5. Data structure operations (contains, add item, insert item, remove item)
6. Data summary recalculation
7. Summary data reset
8. Example computer processing system
9. Clauses Overview The present disclosure relates to logical data structures and data structure operations.

Specifically, the present disclosure describes tree-structured data structures in which data items are stored in leaves. For each leaf node, a leaf node data summary is generated based on the data item stored by that leaf node. For each internal (i.e. non-leaf) node, an internal node data summary is generated based on the summary data of the internal node's child or children nodes.

Generating and maintaining summary data as described herein allows searches for items that are not in the dataset to be quickly terminated, leading to reductions in both search time and search processing.

This disclosure draws a distinction between a data structure (a logical structure that can be used to store data) and a dataset (one or more data items stored in accordance with a data structure).

Furthermore, the present disclosure describes both set-based data structures and list-based data structures, the distinction between discussed below. A dataset stored in accordance with a set-based data structure will be referred to as a set-based dataset, and a dataset stored in accordance with a list-based data structure will be referred to as a list-based dataset. Relevantly, therefore the suffix 'set' in 'dataset' does not indicate the dataset is based on a set-based data structure, as the dataset could be set-based or list-based.

The present disclosure describes processing involved to perform various operations on the data structures described. These include: a contains operation which is performed to determine whether a dataset contains a particular item; an insert item (or add item) operation which is performed to insert an item to a dataset; a remove item operation which is performed to remove an item from a dataset; and a summary data reset process which is performed to manage data summaries with a view to improving performance.

Initially, a computing environment in which the present embodiments can be performed will be described. Following this, techniques and features for creating and using set-type data structures and then list-type data structures is provided. In each case, processing performed to determine whether the data structure contains a particular item, to add a new item to the data structure, and to remove an existing item from the data structure is described. Finally, an example computer processing system for performing the various features and techniques of the present disclosure is described.

Example Computing Environment

FIG. 1 depicts an example of computing environment 100 in which the various features described herein can be performed. Environment 100 is a networked environment which includes a server system 102 in communication with a client system 104 via one or more telecommunications networks 106.

In certain embodiments, the various processing described herein is performed by a data management application (DMA) 108 executing on the server system 104.

Server system 102 further includes data storage 110 on which data managed by the data management application 108 is stored. Data storage 110 may be any appropriate storage device, for example a hard drive (or collection of hard drives). Further, while data storage 110 is illustrated as part of the server system 102 it could be a (or part of a) separate system either in direct or networked communication with the server system 102 (e.g. a networked attached storage device, an entirely separate storage system accessed via a database server, or any other appropriate data storage mechanism).

In the embodiments described below, the DMA 108 performs various operations in response to commands received from (and initiated at) a client application 112 running on client system 104. Accordingly, when executed by the server system 102 the DMA 108 configures the server system 102 to provide server-side functionality to client application 112. To achieve this, the DMA 108 comprises one or more application programs, libraries, or other software elements that implement the features and functions that are described herein.

Where the client application 112 is a web browser, the DMA 108 will be a web server such as Apache, IIS, nginx, GWS, or an alternative web server. Where the client application 112 is a dedicated application provided specifically to interact with the DMA 108, the DMA 108 will be an application server. Server system 102 may be provided with both web server and application server applications to enable it to serve both web browser and dedicated client applications.

While only one client system 104 is depicted in environment 100 a typical environment would include many more client systems served by the server system 102.

Client system 104 hosts a client application 112 which, when executed by the client system 104, configures the client system 104 to provide client-side functionality/interact with sever system 102 (or, more specifically, DMA 108 running thereon).

The client application 112 may be a general web browser application (such as Chrome, Safari, Internet Explorer, Opera, or an alternative web browser application) which accesses the DMA 108 via an appropriate uniform resource locator (URL) and communicates with the DMA 108 via general world-wide-web protocols (e.g. http, https, ftp). Alternatively, the client application 112 may be a specific application programmed to communicate with DMA 108 using defined application programming interface (API) calls.

A given client system 104 may have with more than one client application 112, for example both a general web browser application and a dedicated programmatic client application.

The server system 102 and client system 104 communicate data between each other either directly or indirectly through one or more communications networks 106. Communications network 106 may comprise a local area network (LAN), a public network, or a combination of networks.

Server system 102 has been illustrated as a single system. Server system 104 can, however, be a scalable server system comprising multiple compute nodes which can be commissioned/decommissioned based on processing demands.

Server system 102 may be any computer processing system which is configured (or configurable) by hardware and/or software to provide server-side functionality. Similarly, client system 104 may be any computer processing system which is configured (or configurable) by hardware and/or software to provide client-side functionality. Typically sever systems are server computers that provide greater resources (e.g. processing, memory, network bandwidth) than client systems, but this is not necessarily the case. The resource requirements for a client system are typically far less, and suitable client systems may, for example, be: desktop computers, laptop computers, netbook computers, tablet computing devices, mobile/smart phones, personal digital assistants.

One example of a computer processing system which can be configured as either a server system 102 or a client system 104 is described below with reference to FIG. 12.

Environment 100 is a networked environment. In alternative embodiments, however, the DMA 108 may be locally installed on a computer system (e.g. client system 104) and configured to perform operations for that client system alone. In this case a server system is not required.

Set-Type and List-Type Data Structures

As used herein, a set-based data structure which provides for a dataset of unique items that are not stored in any particular order—i.e. it is not possible to guarantee retrieval of items in any particular order.

Consider the following array as an example of a set-based dataset:

[apple, orange, pear, banana] dataset example 1

In example 1 the order (based on array index) happens to be apple, orange, pear, banana. Semantically, however, the dataset of example 2 as follows is identical:

[pear, apple, banana, orange] dataset example 2

Furthermore, although the order of the items in dataset example 1 is apple, orange, pear, banana this does not necessarily reflect the order in which items were added to the dataset (and there is no mechanism to request retrieval of items from the dataset based on the order in which they were added).

In contrast to set-type data structures, list-type data structures do not require items to be unique and are ordered. Being ordered allows, for example, items to be retrieved from a set-type dataset in the order in which they were added.

Similar operations can be performed on both set-type dataset and list-type datasets. These include contains operations, add/insert operations, and remove operations.

A contains operation is performed to determine whether a dataset includes a particular item.

An insert item operation is performed to insert a new item at a particular location in a dataset. An add item operation can be considered a special case of an insert operation where the particular location is the end of the dataset. As set-type data structures are unordered only add operations are performed on set type datasets. List-type data structures are, however, ordered, so either insert or add (as a special case of insert) operations can be performed on a list-type dataset.

A remove item operation is performed to remove an item from a set.

The list-type data structure described herein exhibits $O(\log(n))$ time behaviour for all these operations, and as such it is a versatile structure that can be used in many applications.

Example Dataset 1

Figure 2:
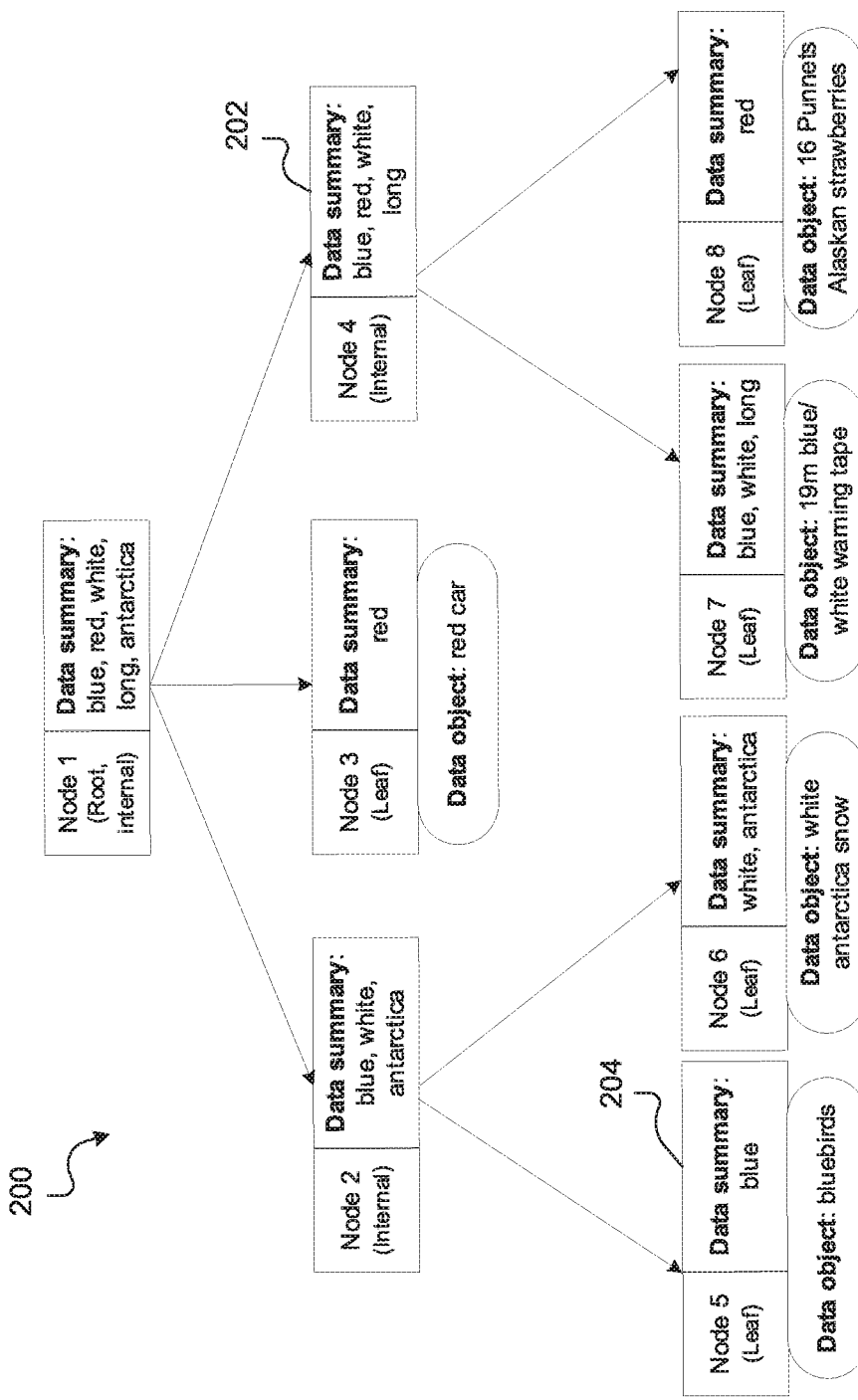
FIG. 2 is an example dataset.

To illustrate features of the present disclosure, FIG. 2 depicts a tree dataset 200 in which dataset items are stored in leaf nodes 204 (e.g. nodes 3, 5, 6, 7, 8).

Each node of dataset 200 includes a data summary. For example, internal node 202 (id 'node 4') has a data summary of 'blue, red, white, long'. (In FIG. 2 node identifiers are also shown, however these is for explanatory purposes and are not required as part of the data structure itself.)

In the example of FIG. 2, a given node can either be a leaf node (in which case the node stores a data item and has no children) or an internal node (in which case the node does not store a data item and has children). Many alternative tree structures exist, however.

As discussed in detail below, the data summary for a leaf node is generated based on the data item stored by that leaf node. The data summary for an internal node is generated based on the data summaries of all children of that node.

For example, in dataset 200: the data summary of leaf node 7 is 'blue, white, long' (generated based on the data item of node 7 "19m blue/white warning tape"); the data summary of leaf node 8 is 'red' (generated based on the data item of node 8 "16 Punnets Alaskan strawberries"); the data summary for node 4, which is parent to nodes 7 and 8, is 'blue, red, white, long' (generated based on the data summary of its children nodes). Similarly, the data summary of node 1, which is parent to nodes 2, 3, and 4, is 'blue, red, white, long, Antarctica' (based on the data summaries of its children nodes 2, 3, and 4).

Each leaf node further includes a data object in which actual item data (i.e. an item of the dataset) is stored. For example, leaf node 204 has node identifier of 'node 5', data summary of 'blue', and a data object storing the data item 'bluebirds'.

While not shown, the nodes of dataset 200 also store other information required to maintain the dataset, for example hierarchy data used to record the location of a given node within the tree structure (e.g. for each node it's immediate child/children node(s)). By way of further example, the DMA 108 can be configured to store the total number of leaf descendants for each node (referred to as size). The size can be used to perform lookup-by-index operations and in some traversal algorithms. For example, in FIG. 2, node 1 has size 5 (5 leaf descendants), node 2 has size 2.

Various node formats can be adopted for set-type and list-type data structures. By way of example, the node format could include the following fields:

| Field | Description |
|---|---|
| Children | E.g. an array of zero or more pointers to other dataset nodes with array index indicating child order (e.g. in an array of n elements, the node ID at index 0 being the ID of the leftmost child node and the node ID at index n − 1 being the ID of the rightmost child). In the case of a binary tree, children data may be stored in two separate fields, for example a left child field (null/blank if no left child) and a right child field (null/blank if no right child). |
| Data summary | The node's data summary (or a pointer thereto) |
| Size (total no. leaf descendants) | E.g. an integer recording the total number of leaf descendants in the node's subtree. |
| Data object | Empty/null for internal nodes. For leaf nodes the actual data item (or a pointer thereto). |

Example node format

Example Dataset 2

Figure 3:
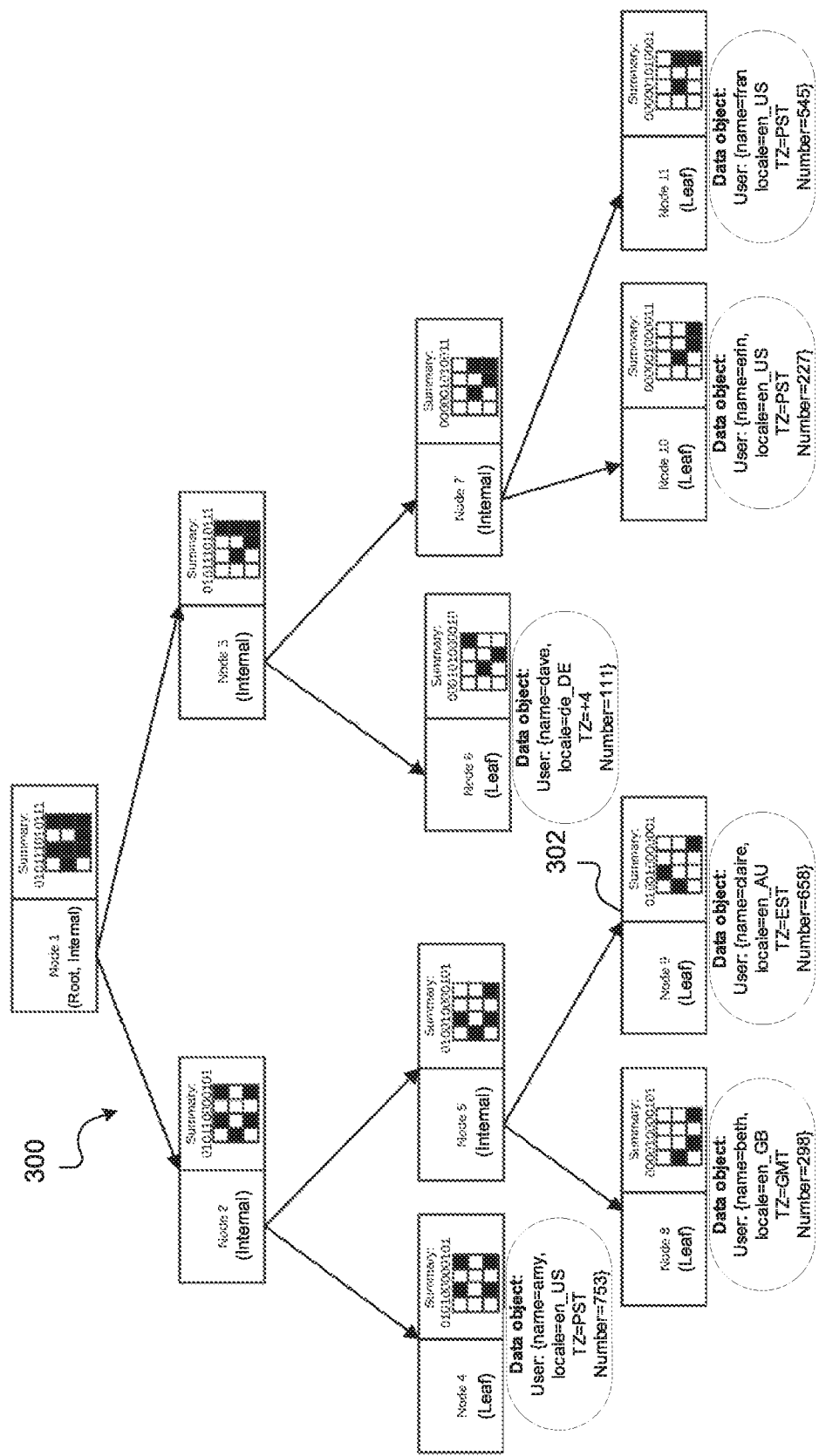
FIG. 3 is another example dataset.

FIG. 3 provides a further example dataset 300. Dataset 300 is similar to dataset 200 with the exception that dataset 300 is a binary tree (in which each node has at most 2 children—a left child and a right child) and the node data summaries in dataset 300 are bitsets (discussed further below).

Summary Data Generation and Comparison

As noted above, in datasets according to the present disclosure (set-type or list-type) each node has an associated data summary. In example dataset 200 the node summaries are test strings, however this is largely for explanatory purposes.

In example dataset 300, the node data summaries are bitsets. This section describes the generation of bitset data summaries for both leaf and internal nodes and the manner in which bitset data summaries are compared (for example in contains operations as described below). These features can be applied to both set-based and data-based data structures.

Using bitsets as data summaries provides a very efficient mechanism for summary determinations in contains operations: e.g. when determining whether a node's data summary matches the search item data summary at 406 below. Using a bitset as the data summary also provides for efficient internal node data summary calculations (i.e. calculating an internal node's data summary based on its children's data summaries).

Leaf Node Data Summary Generation

The tree structures defined herein store data items in leaf nodes. The data summary for a given leaf node is, in turn, calculated based on the data item stored by that leaf node.

Various mechanism exist for generating a bitset based on data. For example, a hash code function can be applied to the data of the data item to generate a bitset. In practice, however, using a raw hashcode may not provide optimal performance characteristics and alternative algorithms such as a bloom filter algorithm can be used to improve performance.

In the present embodiments, three initial considerations are taken into account when implementing bitsets as data summaries: the length of the bitset that is to be used (i.e the number of bits); the number of bits that are to be set (to 1) per data item; and the function or algorithm that is to be used to generate a bitset for a given data item.

The length of the bitset is initially determined based on the number (or anticipated number) of items that are to be stored in the dataset. For example, for an anticipated dataset size of around 10000 items, an initial bitset length of 32 bits may be appropriate. As described below, however, the DMA 108 can be configured to automatically adapt the bitset length over time (in a summary data reset process) if the bitset is found to be longer or shorter than is determined to be optimal.

The number of bits to be set per data item can be varied, but setting 3 or 4 bits per data item (for a bitset length of 32) will typically provide a reasonable trade-off between memory consumption, computation time, summary data reset processing (discussed below), lookup speed, and update speed.

The function or algorithm selected to generate a bitset based on a given data item should be selected in order to provide a relatively uniform distribution of '1' bits.

By way of example, in one implementation the DMA 108 is configured to implement a data summary calculation algorithm in respect of a data item as follows: start with a bitset length of n (e.g. 32); set x bits per data item (e.g. 3); and use the native Java hashCode and modulo operations to generate a bitset in respect of a given item. With these parameters, in order to generate a bitset for a given data item the DMA 108:

a) calculates hashCode of the data item;
b) calculates the hashCode mod n to determine the index of the first bit to set (e.g. to 1);
c) calculates the hashCode mod (n−1) to determine the index of the second bit to set (e.g. to 1);
d) calculates the hashCode mod (n−2) to determine the index of the third bit to set (e.g. to 1);
And (if x>3) so on until the desired number of bits to be set have been determined by calculating:
e) calculates the hashCode mod (n−x) to determine the index of the xth bit to set (e.g. to 1).

For example, if n was 10, x was 3, and the hashcode of the data item was 57:
b) 57 mod 10=7 (i.e. the bit with index 7 is set to 1)
c) 57 mod 9=3 (i.e. the bit with index 3 is set to 1)
d) 57 mod 8=1 (i.e. the bit with index 1 is set to 1)

Accordingly, bits 1, 3, and 7 of the bitset would be set, giving a bitset as follows (noting that in this context the index of the first bit in the bitset is 0): [0101000100].

Alternative methods for generating bitsets are possible.

Internal Node Data Summary Generation

As noted above, the data summary for an internal node is calculated based on the data summaries of the internal node's children. Accordingly, before generating an internal node's data summary the data summaries for its children nodes must be generated.

In order to calculate the data summary for an internal node the DMA 108 is configured to perform a logical or operation on the children node data summaries.

For example, if one child node data summary bitset has a '1' in the 3rd and 9th positions while the other child node data summary bitset has a '1' in the 7th and 9th positions, the resultant bitset summary for the parent of those two nodes will have bits set in the 3rd, 7th, and 9th positions. The overlap of the 9th bit improves memory consumption by reducing it and is also what leads to the probabilistic nature of the structure.

Using dataset 300 of FIG. 3 as an example, as internal node 5 is parent to leaf nodes 8 and 9, the data summary (bitset) of node 5 is the node 8 bitset or'd with the node 9 bitset:

| Node | Data summary (bitset) calculation | Bitset |
|------|-----------------------------------|--------|
| 8 | bitset of leaf node | [000010000101] |
| 9 | bitset of leaf node | [010010000001] |
| 5 | Or of children node bitsets (i.e. node 8 bitset OR node 9 bitset) | [010010000101] |

Example data summary (bitset) calculation

Similarly, the root node (node 1, also an internal node) data summary is generated by performing a logical or operation on the data summaries of its children (nodes 2 and 3):

| Node | Data summary (bitset) calculation | Bitset |
|------|-----------------------------------|--------|
| 2 | Or of children node bitsets (i.e. node 4 bitset OR node 5 bitset) | [010110000101] |
| 3 | Or of children node bitsets (i.e. node 6 bitset OR node 7 bitset) | [010111010111] |
| 1 | Or of children node bitsets (i.e. node 8 bitset OR node 9 bitset) | [010111010111] |

Example data summary (bitset) calculation

Determining if Two Bitset Data Summaries Match

The contains process 400 described below involves determining whether two data summaries match (i.e. a data summary generated in respect of the data item being searched for and the data summary of a given node.

In one implementation, in order to determine whether the search item data summary matches the node data summary the DMA 108 is configured to identify the bits that have been set (e.g. to 1) in the search item data summary and then determine whether corresponding bits have been set in the node data summary. If so, the data summaries match. If not the data summaries do not match.

For example, if the search item data summary was [000100010001] and the dataset node data summary was [01011010111], the DMA 108 determines that the $4^{th}$, $8^{th}$, and $12^{th}$ bits of the search item data summary are set and that the corresponding (i.e. $4^{th}$, $8^{th}$, and $12^{th}$) bits of the node data summary are also set and, therefore the data summaries match.

As an alternative example, if the search item data summary was [000100010001] and the dataset node data summary was [010110000101], the DMA determines that the $4^{th}$, $8^{th}$, and $12^{th}$ bits of the search item data summary are set but that the $8^{th}$ bit of the node data summary is not set and, therefore the data summaries do not match.

Data Structure Operations

This section describes contains, add/insert item operations, and remove item operations. The processing described in this section is predominantly based on binary tree data structures. The processing can, however, be adapted for other (non-binary) tree list-type data structures.

Contains Operation: Set-Type and List-Type Data Structures

Generating and using bitset data summaries as described above provides for efficient searching of the dataset to determine whether a particular data item exists (i.e. efficient contains operations).

Generally speaking, When searching to see if a dataset contains a particular item (a search item), a data summary for the search item is generated using the same function or process that is used to create data summaries for dataset leaf nodes. The search item data summary is then compared to the root node data summary. If the root node data summary does not match the search item data summary, the dataset does not contain the search item and searching can stop. If the root node data summary does match the search item data summary, each child of the root node can then be processed in a similar manner (and, as required, the children's children etc.). Where a node's data summary is determined not to include the search item data summary, whole branches of the dataset which definitively do not contain the search item can be efficiently eliminated from the search. This can significantly reduce the search space, thereby reducing the processing required to perform the search and improve search time.

If a leaf node's data summary matches the search item data summary, the data item of the leaf node is analysed to determine whether it matches the search item—noting that a leaf node's data summary can match the search item data summary without the leaf's data item matching the search item. The result of that check is then returned: true if the leaf data item matches the search item, false otherwise.

Figure 4:
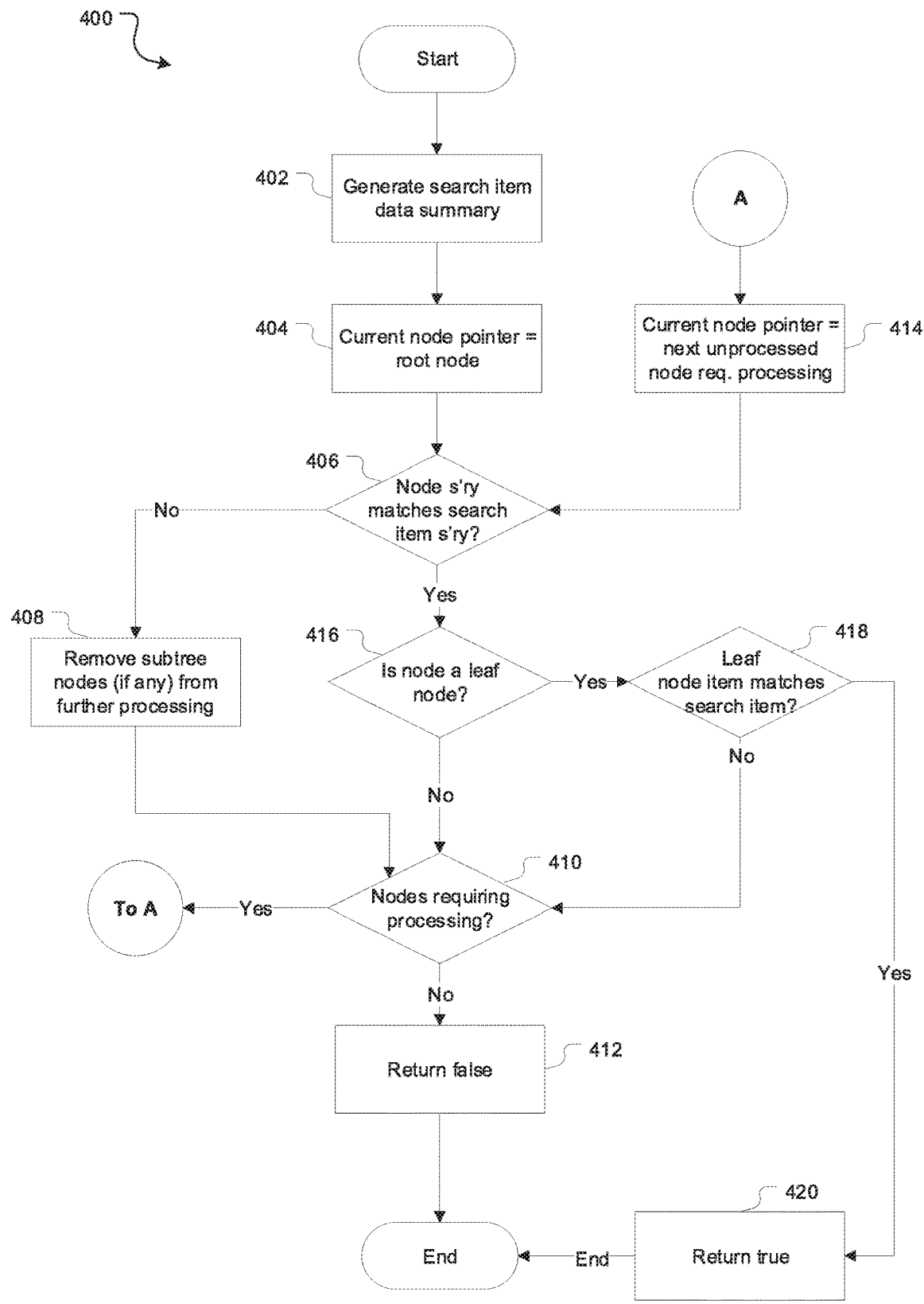
FIG. 4 is a flowchart depicting operations performed in a contains process.

Example processing steps performed by the DMA 108 in a contains operation will be described with reference to contains process 400 of FIG. 4. Contains process 400 can be used for both set-type and list-type data structures.

In this example, a contains operation is initiated by the DMA 108 receiving a contains command from a client application such as client application 112. The contains command includes a search item (i.e. the item the dataset is being searched for).

At 402, the DMA 108 generates a search item data summary. The search item data summary is generated using the same function (or algorithm or process) that is used to generate a data summary for each of the leaf nodes (i.e. nodes storing data items) in the dataset being searched, for example as described above.

At 404, the DMA 108 sets a current node pointer to the root node of the dataset. The node referenced by the current node pointer will be referred to throughout process 400 as the current node.

At 406, the DMA 108 determines whether the current node's data summary (the current node being the root node where 406 follows 404 or an alternative dataset node where operation where 406 follows 414) matches the search item's data summary generated at 402.

If, at 406, the DMA 108 determines that the current node's data summary does not match the search item data summary the search item does not exist in the subtree defined by the current node (i.e. the subtree that the current node is the root of). In this case processing proceeds to 408 and the DMA 108 removes all nodes in the subtree defined by the current node (if any) from further processing. Processing then continues to 410.

At 410, the DMA 108 determines whether there are any remaining nodes in the dataset that that require processing. In this respect, remaining nodes that require processing are any nodes which have not either: been removed from further processing (at 408); or been already processed and disregarded (at 416).

If, at 410, the DMA 108 determines that all nodes requiring processing have been processed processing continues to 412.

At 412, the DMA 108 returns a value indicating that the dataset does not contain the search item—e.g. a result such as 'false', or 'F', or '0', or any other value indicating this. The contains process 400 ends.

If, at 410, the DMA 108 determines that nodes still requiring processing exist, processing continues to 414. At 414, the DMA 108 determines the next unprocessed node that requires processing and updates the current node pointer to reference this node. The DMA 108 can be configured to process the dataset nodes (and, accordingly, select the next node at 414) using various traversal algorithms. As two examples, the DMA 108 can be configured to use a depth first preorder traversal algorithm or a breadth first traversal algorithm. Regardless of the algorithm adopted, any nodes that have been removed from further processing (at 408) are ignored. Following the update of the current node pointer at 414, processing returns to 406.

Returning to 406, if the DMA 108 determines that the current node's data summary does match the search item's data summary, processing proceeds to 416. At 416, the DMA 108 determines whether the current node is a leaf node or not.

If, at 416, the DMA 108 determines that the current node is not a leaf node processing proceeds to 410 to determine whether further nodes requiring processing exist (as discussed above).

If, at 416, the DMA 108 determines that the current node is a leaf node, processing proceeds to 418. At 418, the DMA 108 analyses the data item stored (or referenced by) the leaf node to determine if it matches the search item.

If, at 418, the leaf node data item matches the search item, processing proceeds to 420. At 420, the DMA 108 returns a result (e.g. to client application 112) indicating that the dataset does contain the search item—e.g. a result such as 'true' or 'T', or '1', or any other value indicating this. The DMA 108 may also return additional information at 416, for example a pointer to the node matching the item and/or path information (tracked throughout the contains process) defining the path from the root node to the leaf node that matches the search item. Processing then ends.

If, at 418, the leaf node data item does not match the search item, processing proceeds to 410 to determine whether further nodes requiring processing exist (as discussed above).

Contains Operation: Example 1

To illustrate the contains operation described above, and referencing example dataset 200, consider a query to see if the dataset contains the item '16 punnets Alaskan strawberries'.

At 402, the DMA 108 generates search item data summary—in this case "red".

At 404, the DMA 108 sets the current node pointer to the root node.

With respect to the root node, the DMA 108: determines that the root node data summary matches "red" (at 406); determines that the root node is not a leaf node (at 416); determines there are still nodes requiring processing (at 410); and sets the current node pointer to (in this example) node 2 (the leftmost child of the root node) (at 414).

With respect to node 2, the DMA 108: determines the node 2 data summary does not match "red" (at 406); removes the subtree defined by node 2 (i.e. nodes 5 and 6) from further processing (at 408); determines there are still nodes requiring processing (at 410); and sets the current node pointer to (in this example) node 3 (the next leftmost child of the root node) (at 414).

With respect to node 3, the DMA 108: determines that the node 3 data summary matches "red" (at 406); determines that node 3 is a leaf node (at 416); determines that the node 3 data object ('red car') does not match the search item ('16 punnets Alaskan strawberries') (at 418); determines there are still nodes requiring processing (at 410); and sets the current node pointer to (in this example) node 4 (the next leftmost child of the root node) (at 414).

With respect to the node 4, the DMA 108: determines that the node 4 data summary matches "red" (at 406); determines that node 4 is not a leaf node (at 416); determines there are still nodes requiring processing (at 410); and sets the current node pointer to (in this example) node 7 (the leftmost child of node 4) (at 414).

With respect to node 7, the DMA 108: determines the node 7 data summary does not match "red" (at 406); determines that as node 7 is a leaf there are no subtree nodes to remove (at 408); determines there are still nodes requiring processing (at 410); and sets the current node pointer to (in this example) node 8 (the next leftmost child of node 7) (at 414).

With respect to node 8, the DMA 108: determines that the node 8 data summary matches "red" (at 406); determines that node 8 is a leaf node (at 416); determines that the node 8 data object ('16 Punnets Alaskan strawberries') matches the search item ('16 punnets Alaskan strawberries') (at 418); and returns true (at 420).

In this particular example, 5 relatively inexpensive (from a computational processing requirement perspective) data summary determinations have been made and two relatively expensive equality determinations have been made. This is in contrast to, for example, an approach in which every node is checked, which would result in 5 relatively expensive equality determinations (one for each leaf node). The described approach, therefore, provides a performance improvement of approximately 40% in this hypothetical example.

As an alternative example using the same dataset (of 100), consider a query for the item 'yellow eggs'.

At 402, the DMA 108 generates search item data summary—in this case "yellow".

At 404, the DMA 108 sets the current node pointer to the root node.

With respect to the root node, the DMA 108: determines that the root node data summary does not match "red" (at 406); removes the subtree defined by the root node (i.e. nodes 2, 3, 4, 5, 6, 7, and 8) from further processing (at 408); determines there are no further nodes requiring processing (at 410); and returns false (at 412).

In this example a single inexpensive summary determination is made as opposed to the 5 expensive equality determinations of the naïve approach.

Contains Operation: Example 2

To illustrate the use of bitsets as data summaries, consider dataset 300 of FIG. 3 and a contains operation for the data item 'Gemma'.

At 402, the DMA 108 generates search item data summary. For illustrative purposes, the data summary generated for the data item 'Gemma' is [000100010001].

At 404, the DMA 108 sets the current node pointer to the root node.

With respect to the root node, the DMA 108: determines that the root node data summary matches the search item data summary (at 406); determines that the root node is not a leaf node (at 416); determines there are still nodes requiring processing (at 410); and sets the current node pointer to (in this example) node 2 (the left child of the root node) (at 414).

With respect to node 2, the DMA 108: determines the node 2 data summary does not match the search item data summary (at 406) because the $8^{th}$ bit of the search item data summary is set but the $8^{th}$ bit of the node 2 summary is not; removes the subtree defined by node 2 (i.e. nodes 4, 5, 8, and 9) from further processing (at 408); determines there are still nodes requiring processing (at 410); and sets the current node pointer to (in this example) node 3 (the right child of the root node) (at 414).

With respect to node 3, the DMA 108: determines that the node 3 data summary matches the search item data summary (at 406); determines that node 3 is not a leaf node (at 416); determines there are still nodes requiring processing (at 410); and sets the current node pointer to (in this example) node 6 (the left child of node 3) (at 414).

With respect to node 6, the DMA 108: determines the node 6 data summary does not match the search item data summary (at 406); determines that as node 6 is a leaf there are no subtree nodes to remove (at 408); determines there are still nodes requiring processing (at 410); and sets the current node pointer to (in this example) node 7 (the right child of node 3) (at 414).

With respect to node 7, the DMA 108: determines the node 7 data summary does not match the search item data summary (at 406); removes the subtree defined by node 7 (i.e. nodes 10 and 11) from further processing (at 408); determines there are no further nodes requiring processing (at 410); and returns false (at 412).

In this example, verifying the data item 'Gemma' is not in the dataset has involved 5 relatively fast bitwise comparisons as opposed to a naïve approach would involve 6 relatively slow equality comparisons (one for each data item in the dataset).

While example dataset 300 is a binary tree structure, non-binary variants (in which nodes can be parent to more than two child nodes, for example as per dataset 200 described above) can also be used but will have different performance characteristics.

Add Item Operation: Set-Type Data Structure

Turning to FIG. 5, processing involved in performing an add item operation in a set-type data structure will be described.

At 502, the add operation is commenced and the new item to be added to the dataset is received (e.g. from client application 112) or otherwise accessed by the DMA 108 (based on information received from the client application 112).

As mentioned above, in the present disclosure set-type data structures permit unique items only. Accordingly, at 504, the DMA 108 determines whether the new item received at 502 already exists in the dataset. This can be determined by performing a contains operation (for example as described above with respect to FIG. 3) using the new item as the search item.

If, at 504, the DMA 108 determines that the new item already exists in the dataset (i.e. the contains operation returns true), processing proceeds to 506.

At 506, the DMA 108 generates an appropriate error message or value indicating that the item already exists in dataset and returns it to the process/application requesting the add operation (e.g. client application 112). The add operation is then complete.

If, at 504, the DMA 108 determines that the new item is not already in the dataset (i.e. the contains operation returns false) processing continues to 508 to continue the add operation.

At 508, and if required, the DMA 108 generates a data summary in respect of the new item (e.g. by calculating a hash of the new item data). Generation of the new item data summary could, however, be performed at alternative stages in process 500—for example as part of performing a contains operation at 504 to determine if the dataset already contains the item.

At 510, the DMA 108 determines the location in the dataset where the new item is to be added, and at 512 adds the new item at that location.

In tree-structured datasets, a consideration when adding an item is doing so in a way that aims to maintain the tree structure in a reasonably balanced form. This can be achieved in various ways. For example, in order to determine where to add a new item the DMA 108 can be configured to start at the root node and traverse the tree structure by recursively looking at the selected node's children and selecting the child node with the smallest size until a leaf node is reached. If two (or more in a non-binary implementation) children have the same size either child can be chosen (e.g. the DMA 108 may be configured to always choose the leftmost child in this case). Once a leaf node has been reached, the DMA 108 replaces the leaf node with a new internal node pointing to two child nodes—one of which is the original leaf that has been displaced, the other containing the new data item. In the present implementation, the DMA 108 adds the leaf identified at 510 as the left child of the new internal node and the new item as the right child of the new internal node.

At 514, the DMA 108 recalculates the data summary for all upstream nodes—i.e. nodes in an update path between the new leaf and the root node. Data summary recalculation is discussed further below.

While process 500 provides one example of a process for adding an item to a tree-structured dataset in which items are stored in leaf nodes, alternatives are possible. Importantly, in the present disclosure adding an item to the dataset results in a need to recalculate summary data—either in a data summary recalculation process (described below and indicated at 514) or an alternative process that involves recalculating data summaries (e.g. a summary data reset process, also described below).

Insert (and Add) Item Operation: List-Type Data Structure

The insert and add item operations with respect to list-type data structures are similar to the add item operation for set-type data structure. The difference, however, is that for a list-type data structure an insert location can be specified.

An add item operation for a list-type data structure can be considered a special case of an insert item operation in which the insert location is at the end of the dataset.

Inserting a new item to a list-type data structure will be described with reference to insert item process 600 of FIG. 6.

At 602, the DMA 108 receives the new item to be inserted as well as insertion location information. The insertion location information defines the location in the dataset at which the item is to be inserted. For example, the insertion location information may indicate that the item is to be inserted as the 17th element (in which case the existing 17th item is made the $18^{th}$ item and the new item is inserted as the 17th item). In the case of an add item operation, the location information is either omitted or an 'end of dataset' value is provided which is interpreted by the DMA 108 as the end of the dataset. For example, where an item is to be inserted at the end of the data structure the location information may be location N, where N is the size of the collection in a 0-based numbering scheme (i.e. a numbering scheme in which the first element is at index 0) or the size of the collection+1 in a 1-based scheme (i.e. a numbering scheme where the first element is at index 1).

As a list dataset permits duplicate items, insert item process 600 of the present embodiment does not include an equivalent step to 504 of add item process 500 to see whether the item being added already exists in the dataset.

At 604, the DMA 108 calculates a data summary for the new item. This processing similar to or the same as processing 508 described above.

At 606, the DMA 108 identifies the leaf node at which the new item is to be inserted. This is based on the location information received at 602. If the item is being inserted at the end of the dataset, the DMA 108 selects the last leaf node in the dataset. Otherwise, the DMA 108 uses the nodes' size data to locate the leaf node which is currently at the location the new node is to be inserted (e.g. if the item is to be inserted at index location 3, the DMA 108 uses the size data to locate the $3^{rd}$ leaf node).

At 608, the DMA 108 insets the new item. To do so, the DMA 108 creates a new internal node to replace the leaf node identified at 606. The DMA 108 provides the new internal node with two child leaf nodes: the leaf node identified at 606 and a new leaf node for the item being inserted. In the present implementation, the leaf node identified at 606 is added as the left child of the new internal node and the new leaf node is added as the right child.

If required, after inserting the new item the DMA 108 also determines whether a rotation operation is required performed in order to balance the dataset. In the present embodiment, the DMA 108 is configured to keep extra nodes on the left if one side has more child nodes than the other. Accordingly, the DMA 108 determines a tree rotation is to be performed if the number of child nodes on the right the tree exceeds the number of child nodes on the left. If so, the DMA 108 performs a rotation operation (in this case, where the DMA 108 is preferentially keeping additional nodes on the left, a left rotation). Processing then continues to 610.

At 610, the DMA 108 recalculates the data summary after performing an insert item operation. Data summary recalculation is describe with reference to FIG. 9 above.

In addition, insertion of a node changes the number of leaf nodes, so the DMA 108 also updates size data for relevant nodes when an item is inserted. The DMA 108 can be configured to update size data in any appropriate manner (e.g. by working from the inserted node back up to the root node, updating each node's size in the process). The size update process can, for example, be performed as part of the data summary recalculation (on the basis that both processes need to update nodes from the newly inserted leaf node back to the root).

As with the add item process above, 600 is one example of a process for inserting an item into a tree-structured dataset. Alternative insert item processes can be implemented. Importantly, however, in the present disclosure inserting an item into the dataset results in a need to recalculate summary data—either in a data summary recalculation process (described below and indicated at 610) or an alternative process that involves recalculating data summaries (e.g. a summary data reset process, also described below).

Insert Item Operation: Example

Figure 7A:
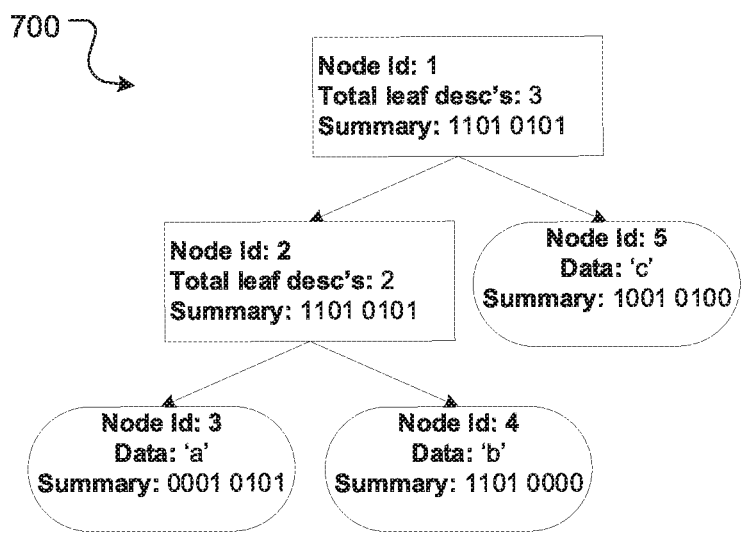
FIGS. 7A and 7B depict an example insert item operation.
Figure 7B:
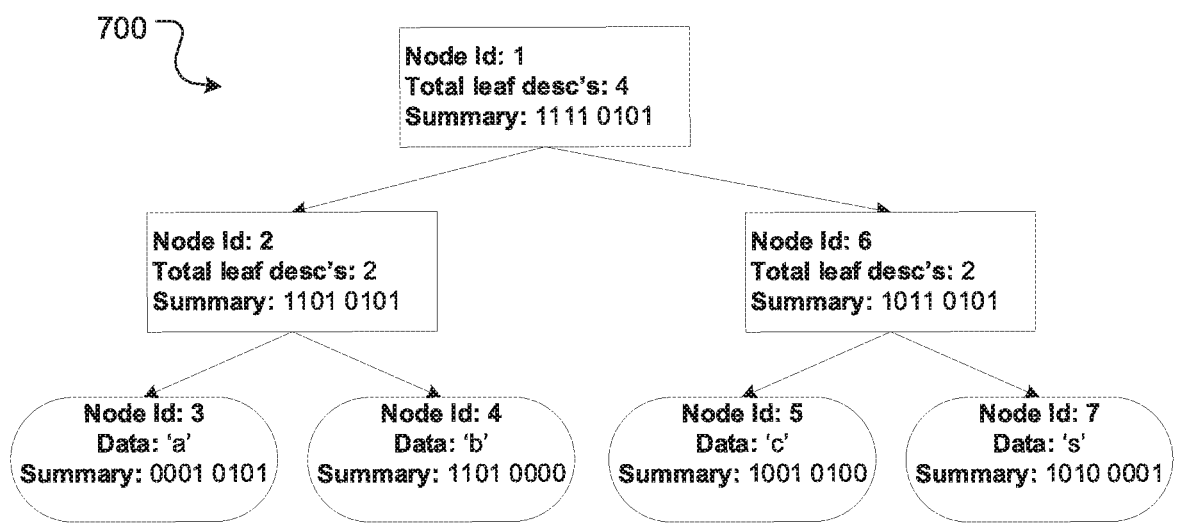

FIG. 7A provides an example list-based dataset 700 in a first state. FIG. 7B shows the list-based dataset 700 after inserting data item 's' at the end of dataset 700. In this example, node 5 is identified at 606 (as the last leaf node of dataset 700) and replaced by a new internal node (node 6). The left child of new internal node is original node 5, and a new leaf node (node 7) is generated for data item 's' and added as the right leaf node of new node 6. In this example the dataset is not unbalanced (or, specifically, the right tree does not have more nodes than the left) so no rotation operation is required.

Following the insertion of new leaf node 7 and internal node 6: the data summary for new node 6 is calculated (based on the data summary of its child nodes 5 and 7) and saved; the size for new node 6 is calculated (2) and saved; the data summary for node 1 (the parent of new node 6) is recalculated (based on the data summary of its child nodes 2 and 6) and saved; and the size of node 1 is recalculated (now 4) and saved.

Remove Item Operation: Set-Type and List-Type Data Structures

Figure 8:
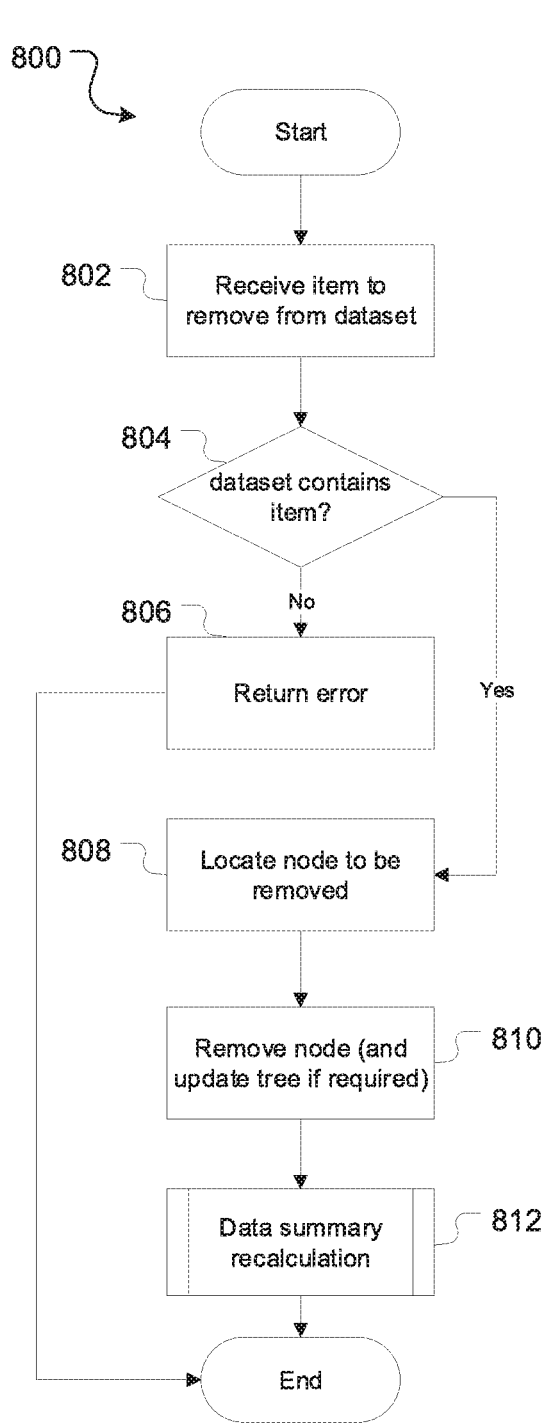
FIG. 8 is a flowchart depicting operations performed in a remove item process.

Turning to FIG. 8, processing involved in performing a remove operation will be described. The processing performed for a remove operation is largely the same for both set-type and list-type data structures.

At 802, the remove operation is commenced and the item to be removed from the dataset is received (e.g. from client application 112) or otherwise accessed by the DMA 108 (based on information received from the client application 112).

At 804, the DMA 108 determines whether the item to be removed exists in the dataset or not. This can be determined by performing a contains operation on the item to be removed.

If, at 804, the DMA 108 determines that the item to be removed does not exist in the dataset (i.e. the contains operation returns false), processing proceeds to 806. At 806, the DMA 108 generates an appropriate error message or value indicating that the item does not exist in dataset and returns it to the process/application requesting the remove operation. The remove operation is then complete. In alternative implementations no error message is returned (on the basis that the intended outcome of the remove operation was a dataset that did not contain a particular item, and that outcome has been satisfied).

If, at 804, the DMA 108 determines that the item to be removed is in the dataset (i.e. the contains operation returns true) processing continues to 808 to locate the relevant node (i.e. the node storing the item that is to be removed). The location of the relevant node may be returned by the contains operation—e.g. in the form of the path from the root to the leaf node storing the item.

At 810, the DMA 108 removes the leaf node storing the item.

Various approaches to leaf node removal can be taken. In one implementation the DMA 108 is configured to delete the leaf node containing the data item in question without any further checks or processing. This approach can, however, create an undesirable tree structure that leads to inefficiencies.

To illustrate this, consider deleting data item 'Claire' (leaf of node 9) in dataset 300. If node 9 is deleted without any further changes to the tree node 5 becomes an internal node with a single child. This creates an unnecessary node visit for any subsequent searches that traverse node 5.

Various steps can be taken in order to avoid or reduce such inefficiencies. For example, the DMA 108 can be configured to implement a rule that an internal node must have at least two children. If removal of a leaf node at 810 causes this rule to be contravened, the DMA 108 also updates the tree structure to remove the internal node that was the parent of the removed leaf node (which now has a single child), and updates the parent of the removed internal node to point directly to the remaining child node.

To illustrate this, consider again the example of deleting data item 'Claire' from dataset 300. After removing leaf node 9 (storing the 'Claire' data item), the DMA 108 identifies that node 5 (the parent of the removed leaf node) is neither a leaf node nor an internal node with two children. Accordingly, the DMA 108 removed node 5 and updates node 2 (the parent of removed internal node 5) to point directly to node 8 (the remaining child node of removed internal node 5).

At 812, the DMA 108 recalculates the data summaries for all nodes in an update path from the removed node to the root. If the parent of the removed leaf node has not been also been deleted (as after removal of the leaf node it still has more than one child), the update path starts at the parent of the removed node and ends at the root (the update path including the parent of the removed node and the root nodes themselves). If the parent of the removed leaf node has also been deleted (due to being an internal node with a single child after deletion of the leaf node), the update path starts at the parent of the now deleted internal node and ends at the root (including again the parent of the deleted internal node and the root node themselves). Summary data recalculation is discussed further below.

While process 800 provides one example of a process for removing an item from a tree-structured dataset in which items are stored in leaf nodes, alternatives are possible. Importantly, in the present disclosure removing an item to the dataset results in a need to recalculate summary data—either in a data summary recalculation process (described below and indicated at 812) or an alternative process that involves recalculating data summaries (e.g. a summary data reset process, also described below).

Data Summary Recalculation

In both the set-based and list-based data structures described herein, the data summary for any internal node is calculated based on the data summaries of that internal node's children nodes. Accordingly, adding a new item to a dataset or removing an existing item from a dataset leads to the need to recalculate data summaries.

In the add item, insert item, and remove item processes described above, data summary recalculation is triggered at 514, 610, and 812 respectively.

Generally speaking, when performing a data summary recalculation process it is necessary only to recalculate data summaries in an update path that is between a starting node (determined based on the added or removed item) and the root node (the starting and root nodes included in the path).

Figure 9:
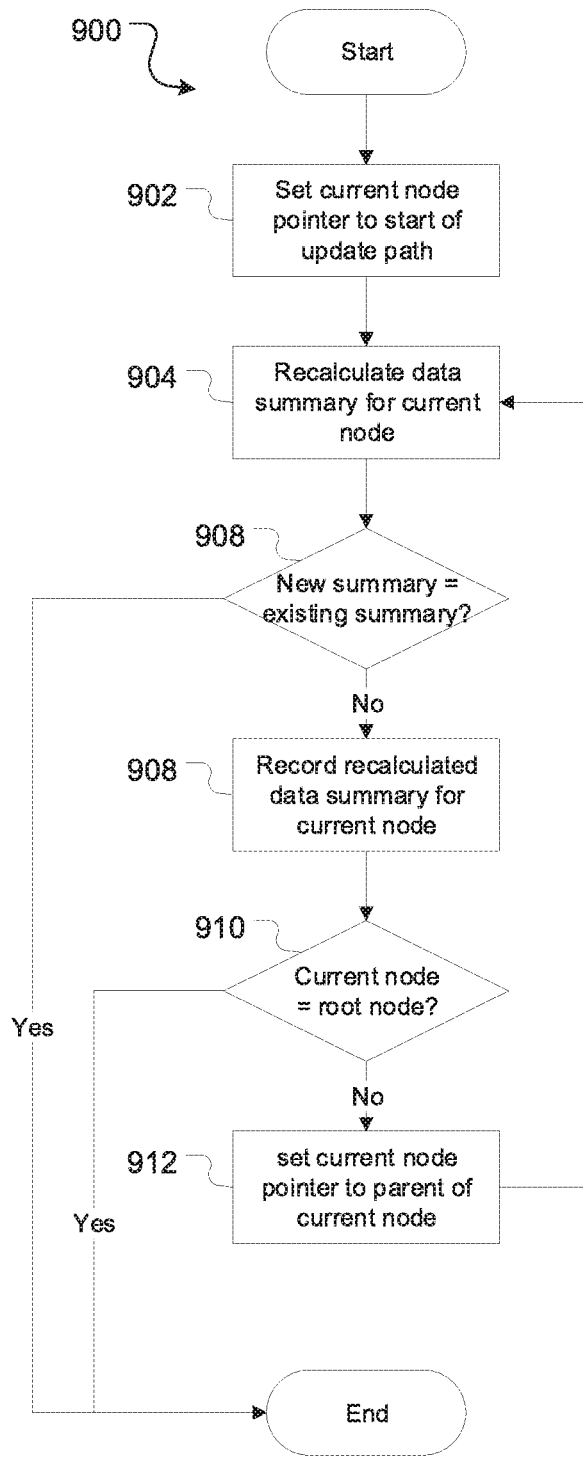
FIG. 9 is a flowchart depicting operations performed in a data summary recalculation process.

In one implementation, the DMA 108 implements a summary recalculation process 900 as described with reference to FIG. 9.

At 902, the DMA 108 determines the starting node of the update path and sets a current node pointer (i.e. a variable indicating a node currently being processed) to this node.

Where an add operation has been performed, the starting node of the update path is the internal node that is the parent of the new leaf node that has been created to store the data item (presuming the data summary for the new leaf node has itself already been calculated and stored).

Where a remove operation has been performed: if the parent of the removed leaf node has not also been removed, the starting node of the update path is the parent of the removed leaf node; if the internal node parent of the removed leaf node has been removed, the starting node of the update path is the parent of the removed internal parent node.

At 904, the DMA 108 calculates the current node's data summary. The current node will be an internal node, and as such its data summary is recalculated by combining the data summaries of its child/children nodes (e.g. in an or operations as described above).

Where recalculating the summary following the removal of a node, and bitsets are used as data summaries as described in the example above, the data summary must be recalculated based on the children items as also described above. Data summaries data cannot be recreated by subtracting the data summary of the removed node from the data summary of the parent as this can result in the data summary of the parent not including some data from the data summary of the other child the parent represents.

In the present embodiment, at 906 the DMA 108 determines if the data summary calculated at 906 is equal to the existing data summary for the current node.

If, at 906, the existing and newly calculated data summary items are equal, the summary recalculation process ends. In this case there is no need to process further upstream nodes as all further summary recalculations will generate the same data summary items that currently exist.

If, at 906, the existing and newly calculated data summary items don't match, processing continues to 908. At 908, the DMA 108 records the new data summary calculated at 904 as the data summary for the current node (replacing the existing data summary)

At 910, the DMA 108 determines whether the current node is the root node. If so the summary recalculation process is complete. If not, processing continues to 912 where the DMA 108 sets the current node pointer to the parent of the current node before returning to 904.

To illustrate the operation of summary recalculation process 900, consider again the example of removing node 9 ('Claire') of dataset 300. In this case the, the original path from the root to the removed node was 1, 2, 5, 9. With the removal of node 9 and subsequent removal of node 5, however, the new path of interest is 1, 2, 8. Accordingly, the starting node is node 2 (i.e. the parent of removed node 5).

Accordingly, the DMA 108: sets the current node pointer to node 2 (at 902); recalculates the node 2 data summary (at 904) based on the data summary of nodes 4 and 8 ([01010001011] OR [000010000101]=[010110000101]); determines that the recalculated data summary for node 2 is the same as its existing summary (at 906); and ends the summary recalculation process.

A recalculated data summary matching an existing data summary is, however, less likely to be the typical case. In an alternative summary recalculation processes, therefore, the DMA 108 is configured to forego the check at 906 and instead recalculate (and replace) the data summaries for all nodes in the update path up to and including the root, regardless of whether a new data summary equals an existing data summary or not.

Where size data is maintained, adding/removing nodes also necessitates updating the size data. Updating size data can be done in a separate process or as part of a summary recalculation process such as 900. Where done as part of summary recalculation process, the size data is recalculated and saved for each node in the update path—for example when updating the summary data at 908. If size data is being updated and the DMA 108 is configured to perform the check at 906, a change to process 900 is required. In this case, even if the DMA 108 determines that the new summary equals the existing summary it continues to process all nodes up to (and including) the root, however only updates size data and does not recalculate data summaries for any further nodes.

As described below, a summary data reset process involves recalculating all node data summaries. Accordingly, if a summary data reset process is to be performed there is no need to also perform a summary data recalculation process.

Summary Data Reset

As discussed above, each time a contains operation is performed for an item that is not in a dataset (set-based or list-based) the contains operation may, depending on the data summary for the given element and the data summary for the root node, terminate at the root or may need to search beyond the root.

Statistically, as a data summary item becomes more densely populated (e.g. full) the more often that searches for items that are not in the dataset will need to go beyond the root node. As used herein, contains operations that return false but from a node other than the root node will be referred to as inefficient contains operations.

Density with respect to a data summary item is a measure of how 'full' that data summary item is. Where the data summary is a bitset as described above, the more bits of a data summary bitset that are set (e.g. take the value '1') the fuller or more densely populated the data summary bitset is.

In the present disclosure, density is calculated expressed as the percentage of set bits in a data summary bitset. In this case: a data summary bitset of [000000000000] has a density of 0% (0.0); a data summary bitset of [111111111111] has a density of 100% (1.0) (referred to as saturation, indicating that every search will return true and thus need to progress beyond the node with this data summary); and a data summary bitset of [010101010101] has a density of 50% (-0.5).

To illustrate data summary density, consider example dataset 300 above, which uses a bitset of length 12 (i.e. 12 bits). In dataset 200, the data summary of the 6 items in the dataset lead to the root node data summary bitset being [010111010111]—i.e. a density of 0.66 (66%). This is relatively densely populated, and as a result many searches for items that are not in the dataset will need to progress beyond the root node. If item was added to dataset 200 that happened to have a data summary of [101000101000], this would lead to the root node summary data bitset being saturated (i.e. completely full: [111111111111])—at which point every contains operation performed on the dataset would need to progress beyond the root node—and every contains for an item not in the dataset would be inefficient.

Data summary items can also be sparsely (i.e. less densely) populated. Although this does not lead to inefficient contains operations, it can indicate that the size of the current data summary items is larger than it needs to be, and as a result the overheads of maintaining the data summaries (e.g. memory consumption, processing cycles to calculate data summaries and compare data summaries) can be reduced by reducing the size of the data summary items without too significantly impacting the performance of contains operations.

In order to manage performance, in certain embodiments the DMA 108 is configured to manage the summary data by periodically performing a data summary reset process. This can involve creating shorter length data summary bitsets (e.g. data summary bitsets with fewer bits, which reduces memory consumption) and recalculating data summaries, creating longer data summary bitsets (e.g. data summary bitsets with additional bits, which should reduce the occurrence of inefficient contains operations) and recalculating data summaries, or maintaining the data summary item length and recalculating the data summaries (using, for example a different hashcode function/bitset creation process that provides a more even distribution of set bits across the bitsets).

This section initially describes a trigger which cause the DMA 108 to initiate a summary data reset process, followed by operations performed to perform the summary data reset.

Summary Data Reset Trigger

The DMA 108 can be configured to initiate a summary data reset process in various ways. In the present embodiments, the DMA 108 initiates a summary data reset process in response to detecting that the density of the root node's data summary either exceeds a defined upper density threshold or falls below a defined lower density threshold.

In alternative embodiments, the DMA 108 is not configured to check or maintain a lower density threshold and, as a result, the data summary length only ever increases and is not reduced by this process.

To implement this trigger process, the DMA is configured to check the density of the root node data summary each time it is recalculated—for example in a summary recalculation process 900. This check will be described with reference to FIG. 10 which shows an extension to the summary data recalculation process 900 (the processing of FIG. 10 being performed, in this instance, after determining that the current node is the root node at 910).

At 1002, the DMA 108 calculates the density of the root node data summary—for example by dividing the number of bits set to 1 in the root node data summary by the data summary length.

At 1004, the DMA 108 compares the root node density calculated at 1002 with a predefined upper density threshold and a predefined lower density threshold. By way of example, the predefined upper density threshold can be set at 0.85 (85%). Where maintained, the predefined lower density threshold may be set at 0.15 (15%). Alternative threshold values can be used. Where a lower density threshold is monitored (and used to trigger a reduction in data summary length) the threshold should be set so that a reduction in data summary length is triggered relatively infrequently in order to reduce the impact on performance.

If, at 1004, the DMA 108 determines that the root node summary data falls between the upper and lower density thresholds (e.g. lower density threshold<=root node density<=upper density threshold), no summary data reset is required and the process ends.

If, at 1004, the DMA determines that the root node density is lower than the lower density threshold or higher than the upper density threshold, processing continues to 1006 where the DMA 108 triggers a summary data reset process.

Additional and/or alternative summary data reset triggers can be implemented. For example, the DMA 108 can be configured to track the number of item addition and/or removal operations and, on reaching defined number of operations, initiate a summary data reset process.

As an additional example, the DMA 108 can also be configured to maintain a minimum data summary length. The minimum data summary length can be calculated with reference to the number of items in the dataset. By way of specific example, the DMA 108 can be configured to calculate a minimum data summary length of twice the number of items in the dataset: i.e. so the number of bits in the data summary is at least twice the number of items in the dataset. The DMA 108 may be configured to perform this check before adding an item to a dataset—e.g. by determining whether the number of bits in the data summary is less than or equal to the minimum data summary length (e.g. less than or equal to twice the number of items in the dataset) and, if so, triggering a summary data reset process.

Summary Data Reset Process

Figures 10, 11:
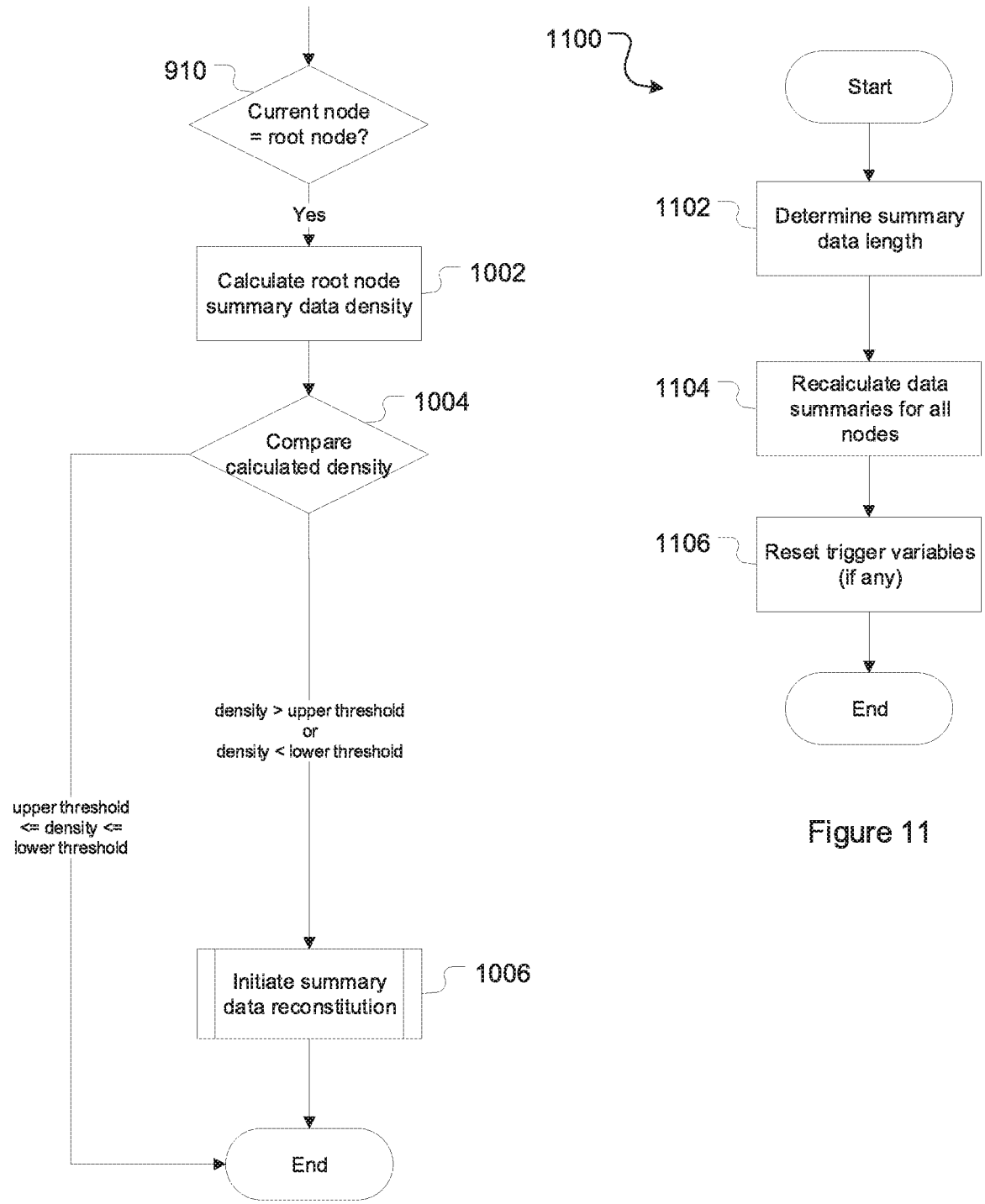
FIG. 10 is a flowchart depicting operations performed to trigger a data summary reset process.
FIG. 11 is a flowchart depicting operations performed in a data summary reset process.

Turning to FIG. 11, a summary data reset process 1100 will be described. Process 1100 is performed when the reset process is triggered, for example as discussed above.

At 1102, the DMA 108 analyses the dataset to determine a new data summary length (e.g. bitset length). Determination of the new data summary length may be based on the event triggering the summary data reset process.

For example, if the event triggering the summary data reset process is a determination that the density of the root node data summary has exceeded the predefined upper density threshold, the data summary length is increased. In one particular implementation the data summary length is increased according to the equation new length=floor(existing length*1.6). Alternative multipliers (or equations) can be used. The overall logic for this adjustment, therefore, is if the DMA 108 determines that the number of bits in the data summary that are set (e.g. to 1) is greater than the predefined upper density threshold (e.g. 85%) it increases the number of available bits by a set upper density exceeded amount (e.g. 60%). Alternative multipliers (or equations) can, however, be used.

In embodiments where a lower density threshold is monitored, if the event triggering the summary data reset process is a determination that the density of the root node data summary is less than the predefined lower density threshold, the data summary length is reduced. In one particular implementation the data summary length is reduced according to the equation new length=floor(existing length*0.8). The overall logic for this adjustment, therefore, is if the DMA 108 determines that the number of bits in the data summary that are set (e.g. to 1) is less than the predefined lower density threshold (e.g. 15%) it decreases the number of available bits by a set lower density reached amount (e.g. 20%). Alternative multipliers (or equations) can, however, be used.

If the event triggering the summary data reset process is a determination that the number of bits in the data summary has (or will once an add item operation is performed) fallen below the minimum data summary length (e.g. twice the number of items in the collection), the DMA is configured to increase the number of bits in the data summary length—for example by doubling the length of the data summary.

At 1104, the DMA 108 recalculates the data summary for all nodes (using the new data summary length as determined at 1102) and saves the recalculated data summaries.

As the data summary for a given internal nodes is calculated based on the data summaries of that node's children nodes, the DMA 108 processes nodes in an order that works up the tree structure—i.e. from leaf nodes up to the root. Various approaches to this can be adopted, for example by recalculating node data summaries in the order they are visited in a post-order traversal of the tree structure or in a reverse level order traversal of the tree structure.

Summary data reset process 1100 is then complete.

As can be seen, by triggering and resetting the summary data as described the length of the summary data is automatically managed, increasing as density becomes too great (and contains operations inefficient) or decreasing as density becomes too sparse (and more memory than is necessary is being used for the summary data).

Computer Processing System

The features and techniques of the present disclosure are implemented using one or more computer processing systems.

Figure 12:
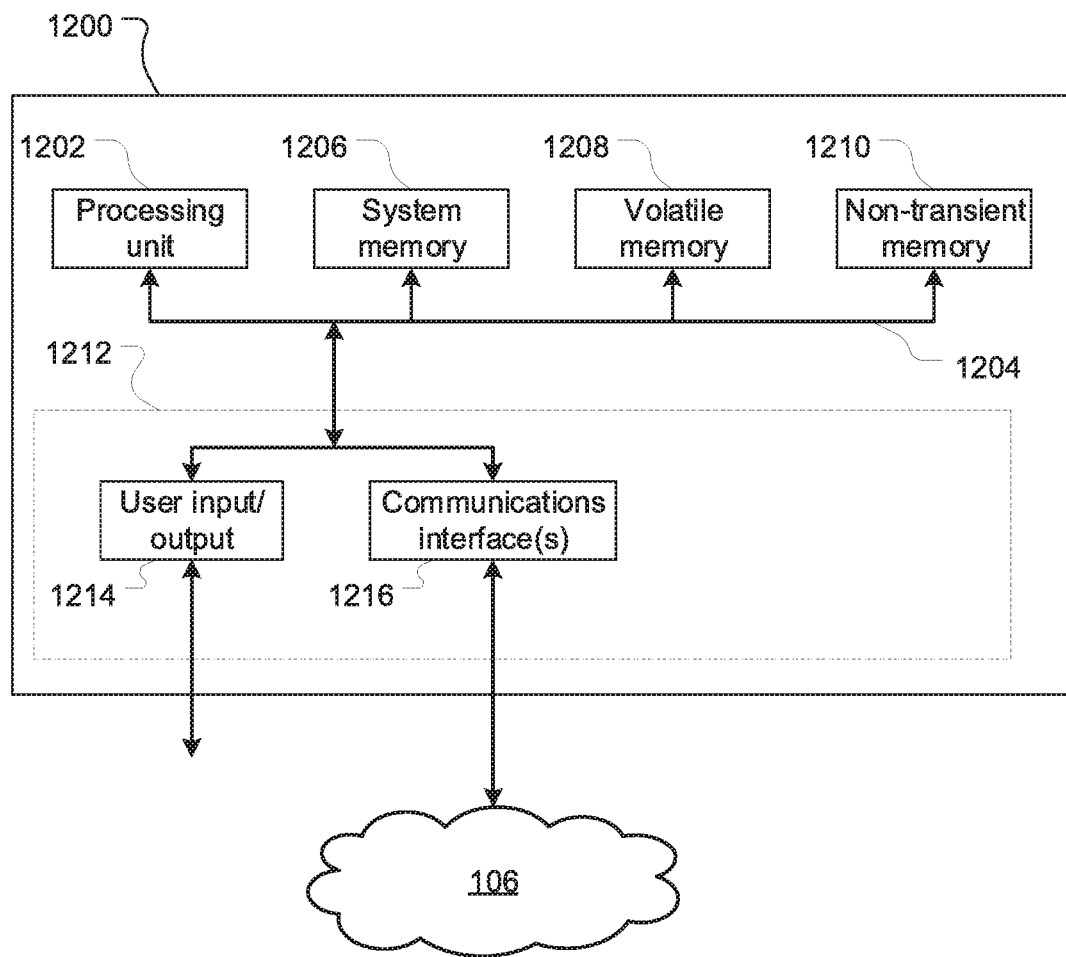
FIG. 12 is a block diagram of a computer processing system configurable to perform various features of the present disclosure.

FIG. 12 provides a block diagram of a computer processing system 1200 configurable to implement embodiments and/or features described herein. System 1200 is a general purpose computer processing system. It will be appreciated that FIG. 12 does not illustrate all functional or physical components of a computer processing system. For example, no power supply or power supply interface has been depicted, however system 1200 will either carry a power supply or be configured for connection to a power supply (or both). It will also be appreciated that the particular type of computer processing system will determine the appropriate hardware and architecture, and alternative computer processing systems suitable for implementing features of the present disclosure may have alternative components to those depicted.

Computer processing system 1200 includes at least one processing unit 1202. The processing unit 1202 may be a single computer processing device (e.g. a central processing unit, graphics processing unit, or other computational device), or may include a plurality of computer processing devices. In some instances all processing will be performed by processing unit 1202, however in other instances processing may also be performed by remote processing devices accessible and useable (either in a shared or dedicated manner) by the system 1200.

Through a communications bus 1204 the processing unit 1202 is in data communication with a one or more machine readable storage (memory) devices which store instructions and/or data for controlling operation of the processing system 1200. In this example system 1200 includes a system memory 1206 (e.g. a BIOS), volatile memory 1208 (e.g. random access memory such as one or more DRAM modules), and non-volatile memory 1210 (e.g. one or more hard disk or solid state drives).

System 1200 also includes one or more interfaces, indicated generally by 1212, via which system 1200 interfaces with various devices and/or networks. Generally speaking, other devices may be integral with system 1200, or may be separate. Where a device is separate from system 1200, connection between the device and system 1200 may be via wired or wireless hardware and communication protocols, and may be a direct or an indirect (e.g. networked) connection.

Wired connection with other devices/networks may be by any appropriate standard or proprietary hardware and connectivity protocols. For example, system 1200 may be configured for wired connection with other devices/communications networks by one or more of: USB; FireWire; eSATA; Thunderbolt; Ethernet; OS/2; Parallel; Serial; HDMI; DVI; VGA; SCSI. Other wired connections are possible.

Wireless connection with other devices/networks may similarly be by any appropriate standard or proprietary hardware and communications protocols. For example, system 1200 may be configured for wireless connection with other devices/communications networks using one or more of: infrared; Bluetooth; Wi-Fi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, and depending on the particular system in question, devices to which system 1200 connects—whether by wired or wireless means—include one or more input devices to allow data to be input into/received by system 1200 for processing by the processing unit 1202, and one or more output device to allow data to be output by system 1200. Example devices are described below, however it will be appreciated that not all computer processing systems will include all mentioned devices, and that additional and alternative devices to those mentioned may well be used.

For example, system 1200 may include or connect to one or more input devices by which information/data is input into (received by) system 1200. Such input devices may include keyboards, mice, trackpads, microphones, accelerometers, proximity sensors, GPS devices and the like. System 1200 may also include or connect to one or more output devices controlled by system 1200 to output information. Such output devices may include devices such as a CRT displays, LCD displays, LED displays, plasma displays, touch screen displays, speakers, vibration modules, LEDs/other lights, and such like. System 1200 may also include or connect to devices which may act as both input and output devices, for example memory devices (hard drives, solid state drives, disk drives, compact flash cards, SD cards and the like) which system 1200 can read data from and/or write data to, and touch screen displays which can both display (output) data and receive touch signals (input).

System 1200 may also connect to one or more communications networks (e.g. the Internet, a local area network, a wide area network, a personal hotspot etc.) to communicate data to and receive data from networked devices, which may themselves be other computer processing systems.

System 1200 may be any suitable computer processing system such as, by way of non-limiting example, a server computer system, a desktop computer, a laptop computer, a netbook computer, a tablet computing device, a mobile/smart phone, a personal digital assistant, a personal media player, a set-top box, a games console. [note repetition in computer processing system description]

Typically, system 1200 will include at least user input and output devices 1214 and a communications interface 1216 for communication with a network such as network 106 of environment 100.

System 1200 stores or has access to computer applications (also referred to as software or programs)—i.e. computer readable instructions and data which, when executed by the processing unit 1202, configure system 1200 to receive, process, and output data. Instructions and data can be stored on non-transient machine readable medium accessible to system 1200. For example, instructions and data may be stored on non-transient memory 1210. Instructions and data may be transmitted to/received by system 1200 via a data signal in a transmission channel enabled (for example) by a wired or wireless network connection.

Applications accessible to system 1200 will typically include an operating system application such as Microsoft Windows®, Apple OSX, Apple IOS, Android, Unix, or Linux.

System 1200 also stores or has access to applications which, when executed by the processing unit 1202, configure system 1200 to perform various computer-implemented processing operations described herein. For example, and referring to the networked environment of FIG. 1 above, client system 104 includes a client application 112 which configures the client system 104 to perform the described client system operations. Similarly, server system 102 includes a data management application 108 which configures the server system 102 to perform the described server system operations, In some cases part or all of a given computer-implemented method will be performed by system 1200 itself, while in other cases processing may be performed by other devices in data communication with system 1200.

Clauses

By way of additional examples, specific methods, systems, and computer-readable storage media of the present disclosure are described the following numbered clauses.

Contains Operation

The following clauses are in respect of determining whether a dataset contains a particular item.

C clause 1: A computer implemented method for determining whether a tree-structured dataset contains a particular data item, the method comprising:
calculating a particular item data summary using a data summary calculation algorithm;
determining whether an internal node data summary of an internal node of the tree-structured dataset matches the particular item data summary; and
in response to determining that the internal node data summary does not match the particular item data summary, determining that a subtree defined by the internal node does not contain the particular item.

C clause 2: A computer implemented method according to C clause 1, wherein in response to determining that the internal node data summary does match the particular item data summary, the method further comprises:
determining whether a child node of the internal node is a leaf node or a further internal node; and
in response to determining that the child node is a further internal node, recursively processing the child node of the internal node and any further children thereof to determine, for a given node, whether the given node's data summary matches the particular item data summary.

C clause 3: A computer implemented method according to C clause 2, wherein in response to determining that the child node of the internal node is a leaf node the method further comprises:
determining whether a leaf node data summary of the leaf node matches the particular item data summary; and
in response to determining that the leaf node data summary does not match the particular item data summary, determining that the leaf node does not store the particular item.

C clause 4: A computer implemented method according to C clause 3, wherein in response to determining that the leaf node data summary does match the particular item data summary, the method further comprises determining that the leaf node does store the particular item and the dataset contains the particular item.

C clause 5. A computer implemented method according to C clauses 3 or 4, wherein the leaf node data summary is generated by applying the data summary calculation algorithm to a data item stored by the leaf node.

C clause 6. A computer implemented method according to any one of C clauses 1 or 5, wherein the data summary calculation algorithm is a bloom filter algorithm.

C clause 7: A computer implemented method according to any one of C clauses 1 to 6, wherein the internal node's data summary was generated based on data summaries of the internal node's children nodes.

C clause 8: A computer implemented method according to any one of C clause 1 to 7, wherein each data summary is a bitset.

C clause 9. A computer implemented method according to C clause 8, wherein determining if a node's data summary matches the particular item data summary comprises determining if bits set in the particular item data summary correspond to bits set in the node's data summary.

C clause 10. A computer implemented method according to any one of C clauses 1 to 9, wherein the internal node is a root node of the dataset.

C clause 11. A computer processing system comprising:
a processing unit;
a communication interface; and
a non-transient computer-readable storage medium storing instructions, which when executed by the processor, cause the processing unit to perform a method according to any one of C clauses 1 to 10.

C clause 12. Non-transient computer-readable storage medium storing instructions, which when executed by a processor, cause a processing unit to perform a method according to any one of C clauses 1 to 10.

Insert Operation

The following clauses are in respect of inserting items into a dataset. As noted above, insert item operations performed with respect to a list-type dataset and add item operations performed with respect to a set-type dataset are similar in many respects. Accordingly, many of the insert operation clauses below apply equally to inserting items in a list-type dataset and adding items in a set-type dataset.

IO clause 1. A computer implemented method for inserting a new item to a tree-structured dataset, the method comprising:
calculating a data summary for the new item using a data summary calculation algorithm;
generating a new leaf node for storing the new item and the new item data summary;
determining a location for the new leaf node in the dataset;
adding the new leaf node to the dataset based on the determined location; and
recalculating data summaries for all internal dataset nodes in an update path starting at a parent of the new leaf node and ending at a root node of the dataset, wherein the data summary for a given internal node in the update path is calculated based on data summaries for each of the given internal node's children nodes.

IO clause 2. A computer implemented method according to IO clause 1, wherein each data summary is a bitset.

IO clause 3. A computer implemented method according to IO clause 1 or clause 2, wherein the data summary calculation algorithm is a bloom filter.

IO clause 4. A computer implemented method according to IO clause 2 or clause 3, wherein calculating the data summary data for a given internal node comprises performing a logical or operation on all data summaries of the given internal node's children nodes.

IO clause 5. A computer implemented method according to any one of IO clauses 1 to 4, wherein determining a location for the new item in the dataset comprises commencing at the root node and recursively selecting a particular child node based on a smallest number of total descendants of that particular child node.

IO clause 6. A computer implemented method according to any one of IO clauses 1 to 5, wherein a location for the new item is determined based on a received insertion location and node data recording, for each node, a total number of leaf descendants of that node.

IO clause 7. A computer implemented method according to any one of IO clauses 1 to 6, wherein prior to adding the new leaf node to the dataset the method further comprises:

determining if the dataset already contains the new item; and in response to determining that the dataset already contains the new item, foregoing adding the new leaf node to the dataset.

IO clause 8. A computer implemented method according to IO clause 7, wherein determining if the data set already contains the new item is performed according to a method of any one of contains clauses 1 to 8 described above.

IO clause 9. A computer implemented method according to any one of IO clauses 1 to 8, wherein the determined location is an existing leaf node and inserting the new leaf node to the dataset comprises:
creating a new internal node and inserting it at the position of the existing leaf node;
inserting the existing leaf node as one child of the new internal node; and
inserting the new leaf node as another child of the new internal node.

IO clause 10. A computer implemented method according to IO clause 9, wherein the existing leaf node is inserted as a left child of the new internal node and the new leaf node is inserted as a right child of the new internal node.

IO clause 11. A computer processing system comprising:
a processing unit;
a communication interface; and
a non-transient computer-readable storage medium storing instructions, which when executed by the processor, cause the processing unit to perform a method according to any one of IO clauses 1 to 10.

IO clause 12. Non-transient computer-readable storage medium storing instructions, which when executed by a processing unit, cause the processing unit to perform a method according to any one of IO clauses 1 to 10.

Summary Data Reset

The following clauses are in respect of resetting summary data in a tree-based dataset.

SDR clause 1. A computer implemented method for managing summary data maintained for each node in a tree-structured dataset, the method comprising:
initiating a summary data reset process, the summary data reset process comprising;
determining a new summary data length;
recalculating data summaries for all nodes in the tree-structured dataset so that data summaries for all nodes have a length is equal to the new summary data length, and wherein for a given subtree of the tree-structured dataset, recalculating data summaries comprises:
initially recalculating data summary items for leaf nodes of the given subtree; and
following recalculation of data summary items for leaf nodes, working progressively up the given sub tree to a root of the given subtree.

SDR clause 2. A computer implemented method according to SDR clause 1, wherein data summaries are bitsets.

SDR clause 3. A computer implemented method according to SDR clause 2, wherein recalculating a data summary for a given leaf node of the tree structured dataset comprises applying a data summary calculation algorithm to a data item stored by the given leaf node.

SDR clause 4. A computer implemented method according to SDR clause 3, wherein the data summary calculation algorithm is a bloom filter.

SDR clause 5. A computer implemented method according to any one of SDR clauses 2 to 4, wherein recalculating a data summary for a given internal node of the tree-structured dataset comprises performing a logical or operation on all data summaries of the given internal node's children nodes.

SDR clause 6. A computer implemented method according to any one of SDR clauses 1 to 5, wherein the summary data reset process is initiated in response to determining that a trigger event has occurred.

SDR clause 7. A computer implemented method according to SDR clause 6, wherein the trigger event is based on a density of a dataset root node's data summary.

SDR clause 8. A computer implemented method according to SDR clause 7, wherein:
the trigger event is determining that the root node's density exceeds a predetermined upper density threshold; and
determining a new summary data length comprises determining a new summary data length that is longer than an existing summary data length.

SDR clause 9. A computer implemented method according to SDR clause 7, wherein:
the trigger event is based on determining that the root node's density is below a predetermined lower density threshold; and
determining a new summary data length comprises determining a new summary data length that is shorter than an existing summary data length.

SDR clause 10. A computer implemented method according to SDR clause 6, wherein the trigger event is based on determining that an existing data summary length will fall below a minimum data summary length.

SDR clause 11. A computer implemented method according to SDR clause 10, wherein the minimum data summary length is based on a number of items maintained in the tree-structured dataset.

SDR clause 12. A computer implemented method according to SDR clause 11, wherein the minimum data summary length is twice the number of items maintained in the tree-structured dataset.

SDR clause 11. A computer processing system comprising:
a processing unit;
a communication interface; and
a non-transient computer-readable storage medium storing instructions, which when executed by the processor, cause the processing unit to perform a method according to any one of SDR clauses 1 to 10.

SDR clause 12. Non-transient computer-readable storage medium storing instructions, which when executed by a processing unit, cause the processing unit to perform a method according to any one of SDR clauses 1 to 10.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

What is claimed is:

1. A computer implemented method for inserting a new item to a tree-structured dataset, the method comprising:
   calculating a new item data summary for the new item using a data summary calculation algorithm, the new item data summary having a bit length equal to a uniform bit length of the tree-structured dataset, each data storage node of the tree-structured dataset having an item data summary of the uniform bit length;
   generating a new leaf node for storing the new item and the new item data summary;
   determining a location for the new leaf node in the dataset;
   adding the new leaf node to the dataset based on the determined location;
   updating size data for all nodes in the dataset;
   determining a density of a data summary in the root node as a ratio of asserted bits to an original length of the root node;
   determining a new summary data length for all nodes in the tree-structured dataset such that data summaries for all nodes have a length equal to the new summary data length, wherein the new summary data length is either (i) greater than the original length, when the density exceeds a first threshold or (ii) less than the original length but greater than a minimum length based on a number of items in the tree-structured dataset, when the density falls below a second threshold that is less than the first threshold; and
   recalculating the data summaries for all internal dataset nodes in an update path starting at a parent of the new leaf node and ending at the root node of the dataset, wherein the data summary for a given internal node in the update path:
      is calculated based on the data summaries for each of the given internal node's children nodes; and
      has a respective bit length equal to the uniform bit length.

2. The computer implemented method of claim 1, wherein each data summary is a bitset.

3. The computer implemented method of claim 1, wherein the data summary calculation algorithm comprises a bloom filter.

4. The computer implemented method of claim 2, wherein calculating the summary for a given internal node comprises performing a logical operation on all the data summaries of the given internal node's children nodes.

5. The computer implemented method of claim 1, wherein determining a location for the new item in the dataset comprises commencing at the root node and recursively selecting a particular child node based on a smallest number of total descendants of the particular child node.

6. The computer implemented method of claim 1, wherein a location for the new item is determined based on a received insertion location and node data recording, for each node, a total number of leaf descendants of that node.

7. The computer implemented method of claim 1, wherein prior to adding the new leaf node to the dataset the method further comprises:
   determining if the dataset already contains the new item; and
   in response to determining that the dataset already contains the new item, foregoing adding the new leaf node to the dataset.

8. The computer implemented method of claim 7, wherein determining if the dataset already contains the new item comprises:
   determining whether a root node data summary matches a particular new item data summary; and
   in response to determining that the root node data summary does not match the particular new item data summary, determining that the dataset does not already contain the new item.

9. The computer implemented method of claim 1, wherein the determined location is an existing leaf node and adding inserting the new leaf node to the dataset comprises:
   creating a new internal node and inserting it at a position of the existing leaf node;
   inserting the existing leaf node as one child of the new internal node; and
   inserting the new leaf node as another child of the new internal node.

10. The computer implemented method of claim 9, wherein the existing leaf node is inserted as a left child of the new internal node and the new leaf node is inserted as a right child of the new internal node.

11. A computer processing system comprising:
   a processing unit;
   a communication interface; and
   a non-transient computer-readable storage medium storing instructions, which when executed by the processing unit, cause the processing unit to:
      calculate a new item data summary having a selected bit length for a new item to insert into a tree-structured dataset, the new data item summary calculated using a data summary calculation algorithm;
      generate a new leaf node for storing the new item and the new item data summary;
      determine a location for the new leaf node in the dataset;
      add the new leaf node to the dataset based on the determined location;
      update size data for all nodes in the dataset;
      determine a density of a data summary in the root node as a ratio of asserted bits to an original length of the root node;
      determine a new summary data length for all nodes in the tree-structured dataset such that data summaries for all nodes have a length equal to the new summary data length, wherein the new summary data length is either (i) greater than the original length, when the density exceeds a first threshold or (ii) less than the original length but greater than a minimum length based on a number of items in the tree-structured dataset, when the density falls below a second threshold that is less than the first threshold; and
      recalculate the data summaries for all internal dataset nodes of the tree-structured dataset in an update path starting at a parent of the new leaf node and ending at the root node of the dataset, wherein the data summary for a given internal node in the update path is calculated based on the data summaries for each of the given internal node's children nodes and has a bit length equal to the selected bit length.

12. The system of claim 11, wherein each data summary is a bitset.

13. The system of claim 11, wherein the data summary calculation algorithm comprises a bloom filter.

14. The system of claim 12, wherein calculating the data summary for a given internal node comprises performing a logical operation on all the data summaries of the given internal node's children nodes.

15. The system of claim 11, wherein determining a location for the new item in the dataset comprises commencing at the root node and recursively selecting a particular child node based on a smallest number of total descendants of the particular child node.

16. The system of claim 11, wherein a location for the new item is determined based on a received insertion location and node data recording, for each node, a total number of leaf descendants of that node.

17. The system of claim 11, wherein prior to adding the new leaf node to the instructions cause the processing unit to:
determine if the dataset already contains the new item; and
in response to determining that the dataset already contains the new item, forego adding the new leaf node to the dataset.

18. The system of claim 17, wherein determining if the dataset already contains the new item comprises:
determining whether a root node data summary matches a particular new item data summary; and
in response to determining that the root node data summary does not match the particular new item data summary, determining that the dataset does not already contain the new item.

19. The system of claim 11, wherein the determined location is an existing leaf node and adding the new leaf node to the dataset comprises:
creating a new internal node and inserting it at a position of the existing leaf node;
inserting the existing leaf node as one child of the new internal node; and
inserting the new leaf node as another child of the new internal node.

20. Non-transient computer-readable storage medium storing instructions, which when executed by a processing unit, cause the processing unit to:
calculate a new item data summary for a new item to be inserted into a tree-structured dataset, the new data item summary calculated using a data summary calculation algorithm and having a bit length equal to a uniform bit length associated with the tree-structured dataset, each data storage node of the tree-structured dataset having a data item summary of the uniform bit length;
generate a new leaf node for storing the new item and the new item data summary;
determine a location for the new leaf node in the dataset;
add the new leaf node to the dataset based on the determined location;
update size data for all nodes in the dataset;
determine a density of a data summary in the root node as a ratio of asserted bits to an original length of the root node;
determine a new summary data length for all nodes in the tree-structured dataset such that the data summaries for all nodes have a length equal to the new summary data length, wherein the new summary data length is either (i) greater than the original length, when the density exceeds a first threshold or (ii) less than the original length but greater than a minimum length based on a number of items in the tree-structured dataset, when the density falls below a second threshold that is less than the first threshold; and
recalculate the data summaries for all internal dataset nodes in an update path starting at a parent of the new leaf node and ending at the root node of the dataset, wherein the data summary for a given internal node in the update path is calculated to the uniform bit length and based on the data summaries for each of the given internal node's children nodes.

* * * * *